United States Patent [19]

Miyake

[11] Patent Number: 5,310,192
[45] Date of Patent: May 10, 1994

[54] SHOOTING GAME AND EXTERNAL STORAGE USED THEREFOR

[75] Inventor: Masahito Miyake, Kyoto, Japan

[73] Assignee: Nintendo Co., Ltd., Kyoto, Japan

[21] Appl. No.: 918,708

[22] Filed: Jul. 27, 1992

[30] Foreign Application Priority Data

Dec. 28, 1991 [JP] Japan ................ 3-358480

[51] Int. Cl.$^5$ .................. A63F 9/22; F41G 3/26
[52] U.S. Cl. .................... 273/310; 273/312; 273/313; 434/22
[58] Field of Search ............... 273/310, 311, 312, 313, 273/314, 315, 316, 433, 434, 438, 85 G, DIG. 28; 434/16, 19, 20, 21, 22

[56] References Cited

U.S. PATENT DOCUMENTS

| 4,185,825 | 1/1980 | Bromley | 273/313 |
| 4,205,847 | 6/1980 | Steiger . | |
| 4,210,329 | 7/1980 | Steiger et al. | 273/312 |
| 4,395,045 | 7/1983 | Baer | 273/312 |
| 4,481,000 | 11/1984 | Mohon | 273/313 |
| 4,619,616 | 10/1986 | Clarke | 273/310 |
| 4,813,682 | 3/1989 | Okada | 273/312 |
| 5,090,708 | 2/1992 | Gerlitz et al. | 273/310 |

FOREIGN PATENT DOCUMENTS 60-171063 of 1985 Japan .

Primary Examiner—Jessica J. Harrison
Attorney, Agent, or Firm—Nixon & Vanderhye

[57] ABSTRACT

A video game set (1) displays a sighting mark on a television receiver (4). A player shoots this sighting mark by a shooting scope (5). At this time, the shift between a coordinate position of the sighting mark and a coordinate position which is shot is operated by the video game set (1) and is stored as a correction value. When the player shoots a target in a game mode, the coordinate position which is shot is corrected on the basis of the correction value stored in the video game set (1).

24 Claims, 20 Drawing Sheets

SHOOTING GAME AND EXTERNAL STORAGE USED THEREFOR

BACKGROUND OF THE INVENTION

1. Field of the Invention

The present invention relates to a shooting game system and an external storage used therefor. More particularly, it relates to a shooting game system adapted as to display a target on a raster scan type display and shoot the target displayed with a shooting scope, and an external storage used therefor.

2. Description of the Prior Art

Shooting game system adopted to shoot a target displayed on a television receiver with a shooting scope, such as the shooting game system disclosed in U.S. Pat. No. 4,395,045 (hereinafter referred to as first prior art) and the shooting game system disclosed in Japanese Patent Laid-Open Gazette No. 171063/1985 (corresponding U.S. Pat. No. 4,813,682) (hereinafter referred to as second prior art) have been conventionally known.

In the above described first prior art, an image of a target displayed on a television receiver is detected on the side of a shooting scope, and its detection pulse is transmitted to a computer connected to the television receiver. The computer detects a coordinate position which is shot on the screen of the television receiver on the basis of the phase difference between the detection pulse received and synchronizing signals (horizontal and vertical synchronizing signals) of the television receiver.

The above described second prior art is a adapted as to display a character of a target in white and a background in black when a trigger switch of a shooting scope is depressed, and determines if there is a "hit" depending on whether or not an image of this character is detected by the shooting scope.

The first prior art is a adapted as to correct the coordinate position which is shot by the shooting scope on the screen of the television receiver when a hit determination is made. The reason for this is that an optical axis of the barrel of the shooting scope and a sighting axis of a gunsight do not exist on the same straight line, so that there occurs a shift between the optical axis and the sighting axis on the screen of the television receiver. However, this correction processing is performed using a fixed correction value. Therefore, the first prior art has the disadvantage in that no fixed correction can be made and inaccurate hit determinations are is made in cases, for example, where an angle at which a player looks into the gunsight deviates from a previously presumed angle or an angle which the optical axis of the barrel forms with the sighting axis of the gunsight deviates from a previously presumed angle due to a manufacturing error, and the distance between the television receiver and the shooting scope deviates from a previously presumed distance.

Furthermore, the first prior art also has the disadvantage in that an optical system provided for the shooting scope and an optical system provided for the computer are easily adversely affected by ambient light from the exterior (for example, due to illuminating light of a fluorescent lamp or the like or due to substantial adjustment of the luminance of the television receiver), and an error is liable to occur in detection of a light receiving signal from the target of the television receiver.

On the other hand, the second prior art has the disadvantage in that the precision of hit determination is low when a small target is shot because a coordinate position which is shot by the shooting scope can be only detected for each character.

Furthermore, the second prior art has the disadvantage in that an accurate hit judgment can not be made when an optical axis of the barrel of the shooting scope and a sighting axis of a gunsight are shifted because the coordinate position which is shot is not corrected.

SUMMARY OF THE INVENTION

Therefore, an object of the present invention is to provide a shooting game system capable of detecting even a small target such as a dot unit with high precision.

Another object of the present invention is to provide a shooting game system which is not easily adversely affected by ambient light from the exterior and always allows high-precision detection.

Still another object of the present invention is to provide a new external storage used for a shooting game system.

The present invention provides a shooting game system for shooting a target displayed on a raster scan type display in a position spaced apart from the display to play a shooting game, which comprises a game processing apparatus being connected to the display for performing processing for the shooting game, and a shooting scope used in a position spaced apart from the display and for shooting the target displayed on the display. The shooting scope comprises trigger signal generating means, photoelectric converting means, and control signal transmitting means. The trigger signal generating means generates a trigger signal in response to an operation performed by a player. The photoelectric converting means converts light from a position which is shot on the display into an electric signal which is synchronized with raster scanning of the display. The control signal transmitting means transmits a control signal based on the electric signal output from the photoelectric converting means to the game processing apparatus in response to the trigger signal from the trigger signal generating means. The game processing apparatus comprises control signal receiving means, shot coordinate position detecting means, reference mark display controlling means, error operating means, error storing means, target display controlling means, correcting means, and hit judging means. The control signal receiving means receives the control signal transmitted from the control signal transmitting means. The shot coordinate position detecting means detects a coordinate position which is shot by the shooting scope on the display on the basis of the control signal received by the control signal receiving means. The reference mark display controlling means displays a reference mark in a predetermined fixed position on the display before starting the game. The error operating means operates, when the reference mark is shot by the shooting scope, an error between the coordinate position detected by the shot coordinate position detecting means and a coordinate position of the reference mark. The error storing means stores the error operated by the error operating means. The target display controlling means displays the target on the display while the game is played. The correcting means corrects, when the target on the display is shot by the shooting scope, the relative positional relationship between a coordinate position of the target and the coordinate position detected by the shot coordinate position detecting means on the basis of the error stored in the error storing means. The hit judging means makes hit judgment in a case where the target is shot by the shooting scope on the basis of the relative positional relationship after being corrected by the correcting means.

According to the present invention, the reference mark is displayed on the display before starting the game, the error between the coordinate position which is shot by the shooting scope on the display and the coordinate position of the reference mark is previously operated, and the relative positional relationship between the coordinate position which is shot by the shooting scope on the display and the coordinate position of the target displayed on the display is corrected on the basis of the above described error operated when the game is played. Accordingly, fine correction can be made in consideration of various factors (the change in distance between the display and the shooting scope, a player's habit, the variation in properties of products, and the like). Consequently, more accurate correction can be always made, as compared with the conventional case where correction is made on the basis of a fixed correction value, to allow accurate sighting and hit judgment.

According to another aspect of the present invention, only the control signal transmitted by the control signal transmitting means is extracted from a receiving signal of the control signal receiving means on the basis of the periodicity of a plurality of pulse signals included in the receiving signal, and the coordinate position which is shot by the above described shooting scope on the above described display is detected on the basis of this control signal extracted, thereby to make it possible to prevent a malfunction due to the disturbance light or the like.

An external storage according to the present invention is used for a shooting game system comprising a game processing apparatus connected to a raster scan type display, and a shooting scope used in a position spaced apart from the display and for shooting a target displayed on the display, and is relevantly connected to the game processing apparatus. The shooting scope comprises trigger signal generating means for generating a trigger signal in response to an operation performed by a player, photoelectric converting means for converting light from a position which is shot on the display into an electric signal which is synchronized with raster scanning of the display, and control signal transmitting means for transmitting a control signal based on the electric signal outputted from the photoelectric converting means to the game processing apparatus in response to the trigger signal from the trigger signal generating means. The game processing apparatus comprises information processing means for performing predetermined processing for the shooting game in accordance with program data applied from the external storage, and control signal receiving means for receiving the control signal transmitted from the control signal transmitting means. The external storage comprises first to sixth program storing means and error storing means. The first program storing means stores first program data for detecting a coordinate position which is shot by the shooting scope on the display on the basis of the control signal received by the control signal receiving means. The second program storing means stores second program data for displaying a reference mark in a predetermined fixed position on the display before starting the game. The third program storing means stores third program data for operating, when the reference mark is shoot by the shooting scope, an error between the coordinate position detected in accordance with the first program data and a coordinate position of the reference mark. The error storing means stores the error operated in accordance with the third program data. The fourth program storing means stores fourth program data for displaying the target on the display while the game is played. The fifth program storing means stores fifth program data for correcting, when the target on the display is shot by the shooting scope, the relative positional relationship between a coordinate position of the target and the coordinate position detected in accordance with the first program data on the basis of the error stored in the error storing means. The sixth program storing means stores sixth program data for making hit judgment in a case where the target is shot by the shooting scope on the basis of the relative positional relationship after being corrected in accordance with the fifth program data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE PREFERRED EMBODIMENTS

Figure 1:
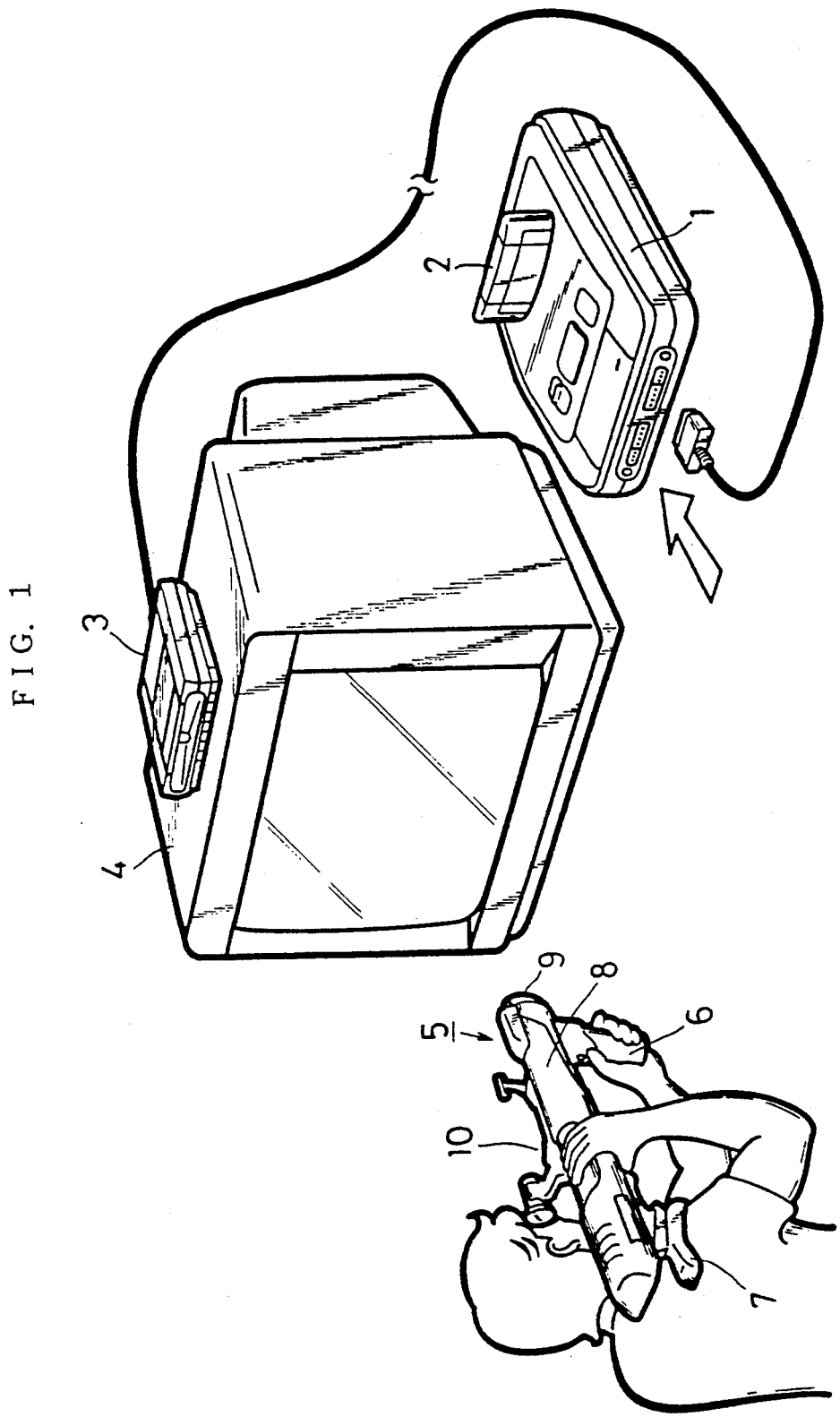
FIG. 1 is a perspective view illustrating a state where a shooting game system according to one embodiment of the present invention is used.

FIG. 1 is a perspective view showing the construction of a shooting game system according to one embodiment of the present invention. In FIG. 1, a ROM cartridge 2 containing a memory (ROM) storing program data is detachably mounted on a video game set 1, and a receiver 3 is connected thereto. As can be seen from FIG. 1, the video game set 1 may, for example, be the commercially available Super Nintendo Entertainment System sold by the assignee of the present invention. The video game set 1 is further connected to a television receiver 4 and displays images of a target, a background and the like for a game on the television receiver 4 on the basis of the program data. Alternatively, an optical disk may be used in place of the ROM cartridge 2 as means for storing program data. In this case, an optical disk recording and reproducing apparatus for reading recorded data of the optical disk is connected to the video game set 1 to transfer the program data read by the optical disk recording and reproducing apparatus.

A player grasps a grip 6 of a shooting scope 5 in his one hand, carries the shooting scope 5 with a stock 7 on his shoulder, and puts the other hand in an approximately central part in the longitudinal direction of a barrel 8 to hold the shooting scope 5. The player uses the shooting scope 5 with a muzzle 9 being directed toward the television receiver 4 from a place spaced apart from the receiver 3. A control signal is converted into a light signal of infrared rays or the like which is transmitted to the receiver 3 in response to operations of a plurality of switches provided in an approximately central part in the longitudinal direction of the shooting scope 5. The video game set 1 changes image display and outputs voice in conformity to the progress of the game on the basis of the program data in response to the signal from the receiver 3.

A gunsight 10 mounted on the upper part of the barrel 8 is so detachably constructed that it can be mounted on the right or left side to suit to player's own convenience.

Figure 2:
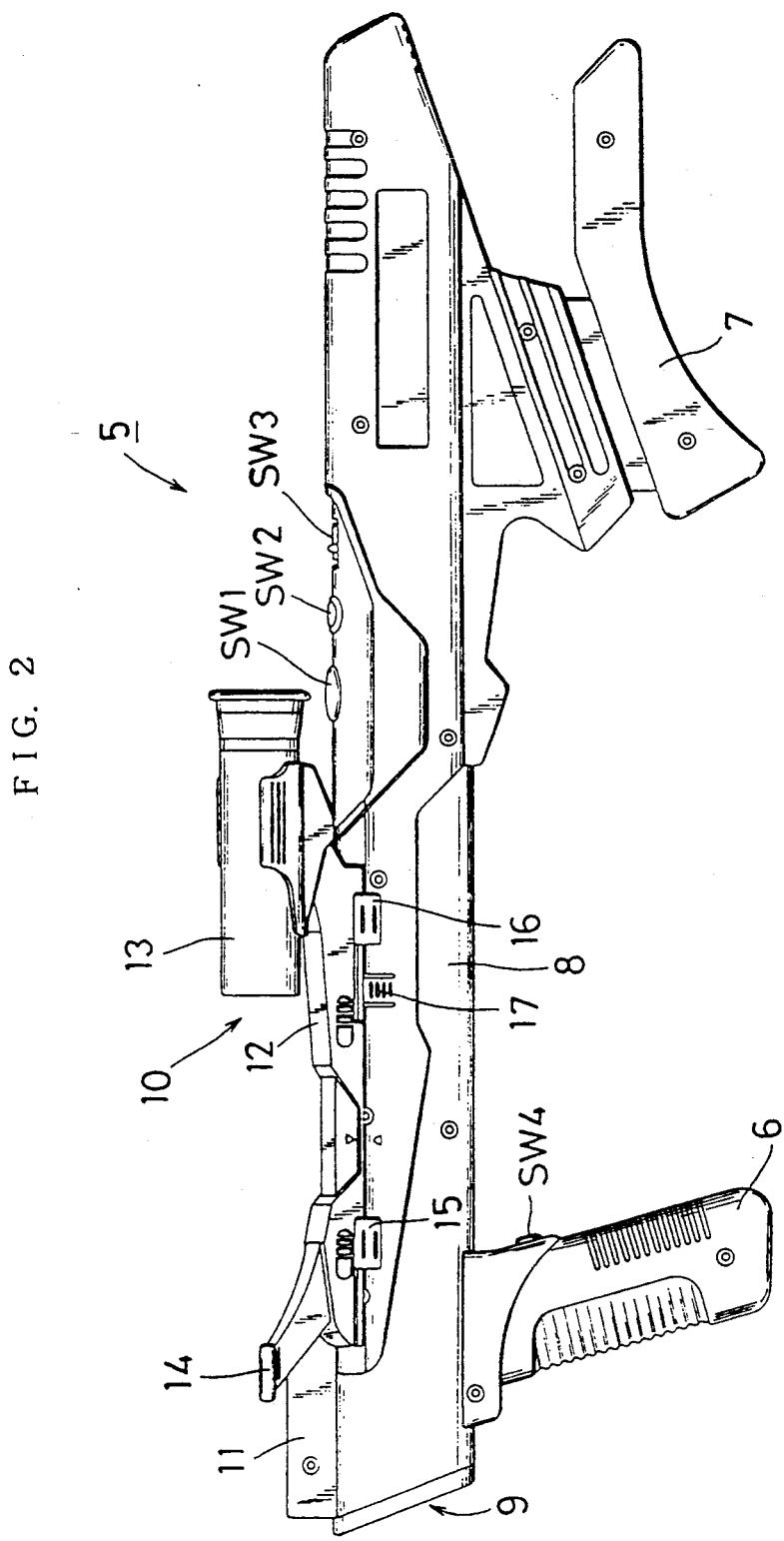
FIG. 2 is a right side view illustrating a shooting scope shown in FIG. 1.
Figure 3:
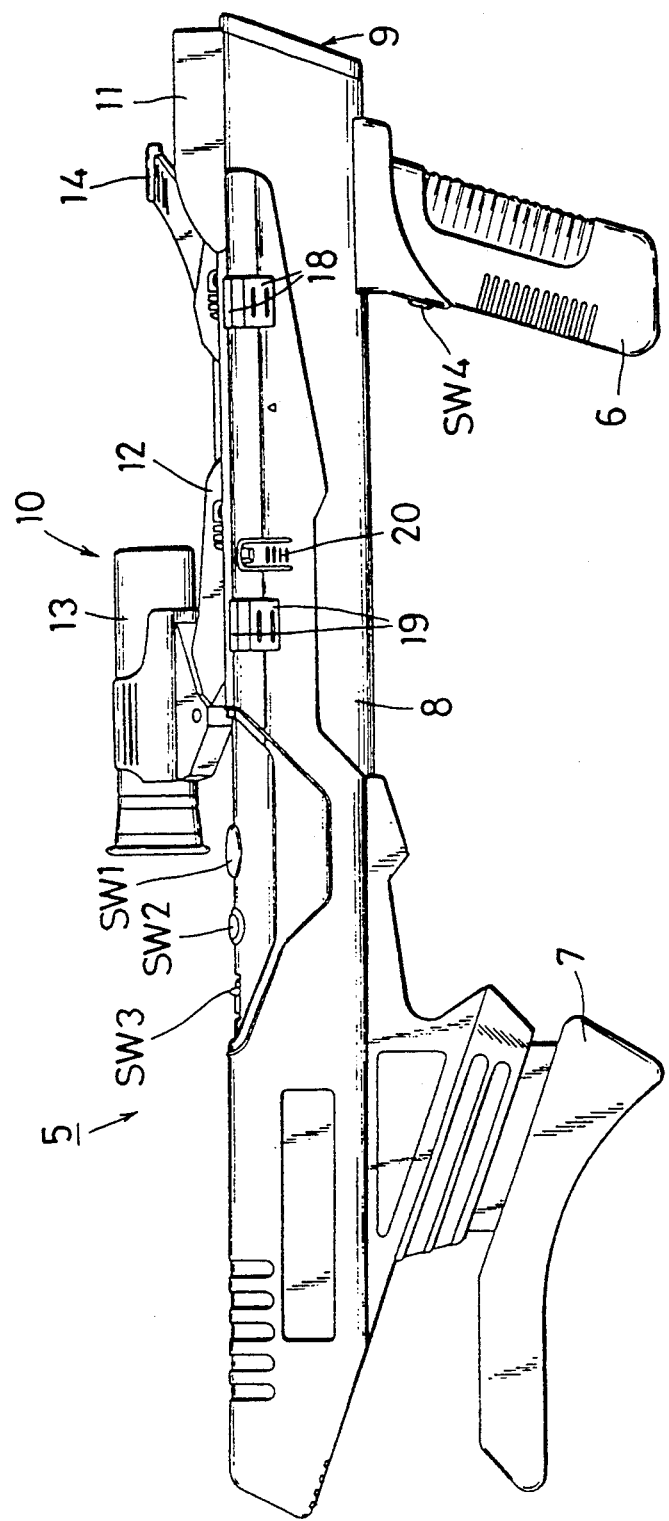
FIG. 3 is a left side view illustrating the shooting scope shown in FIG. 1.
Figure 4:
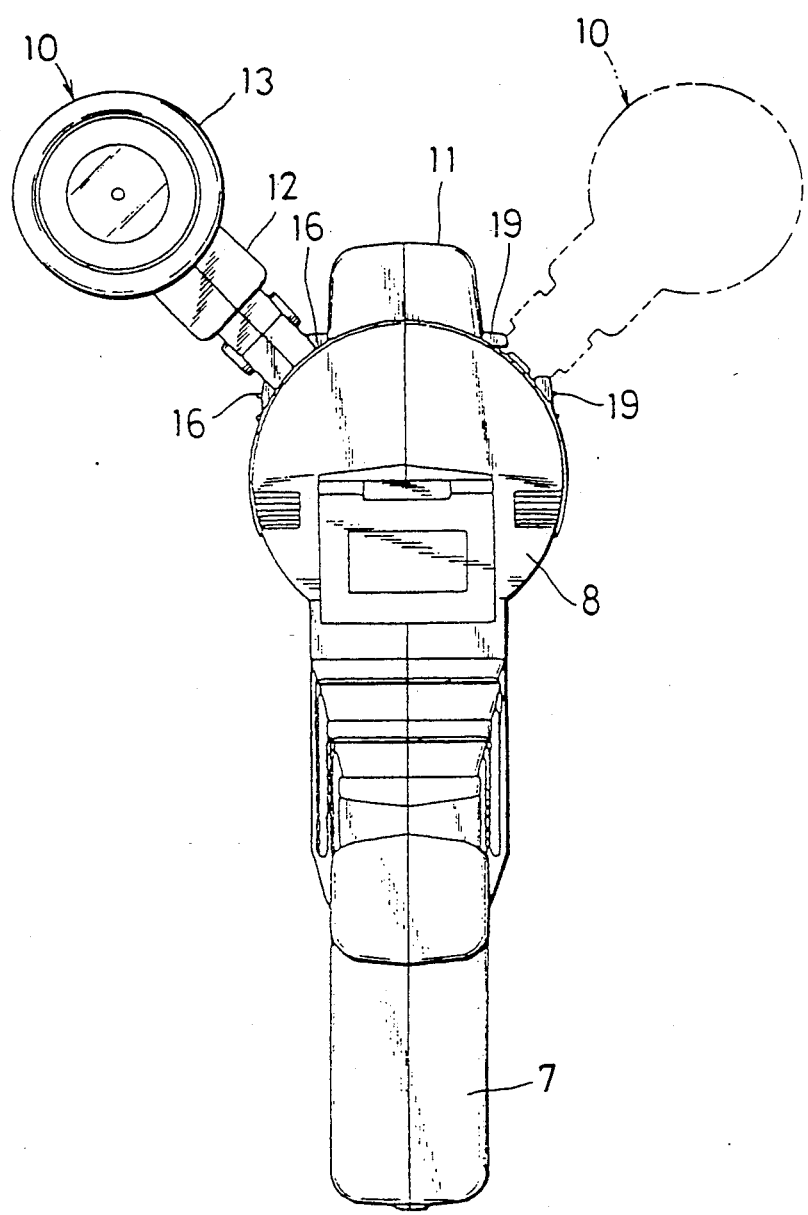
FIG. 4 is a rear elevation illustrating the shooting scope shown in FIG. 1.

FIGS. 2, 3 and 4 are respectively a right side view, a left side view and a rear elevation illustrating the shooting scope 5 used in one embodiment of the present invention. Referring now to FIGS. 2 to 4, description is made of the structure of the appearance of the shooting scope 5.

A stock 7 is provided beneath the rear in the longitudinal direction of a barrel 8. In addition, a grip 6 is provided beneath the front in the longitudinal direction of the barrel 8. Further, a gunsight 10 is detachably mounted on the upper front part in the longitudinal direction of the barrel 8. A trigger switch SW1, a pause switch SW2, and a power supply/continuous shooting switch SW3 are provided in an approximately central part of the barrel 8 and in the rear of the gunsight 10. The trigger switch SW1 and the pause switch SW2 are constructed as push button switches, and the power supply/continuous shooting switch SW3 is constructed as a slide switch. The trigger switch SW1 generates a single shooting signal every time it is depressed in a state where the power supply/continuous shooting switch SW3 as described later is in a second stopped position, and continuously generates a shooting signal in a time period during which it is depressed in a state where the power supply/continuous shooting switch SW3 is in a third stopped position. The pause switch SW2 generates a pause signal when it is depressed. The power supply/continuous shooting switch SW3 has three stopped positions, and gives a command to turn the power supply off in the first stopped position, to turn the power supply on in the second stopped position, and to select a continuous shooting mode in the third stopped position. A cursor switch SW4 is provided on the rear side surface of the grip 6. This cursor switch SW4 generates a display command signal of a cursor when it is depressed. The gunsight 10 comprises a mount 12, and a scope 13 and a foresight 14 which are held on this mount 12. The mount 12 is fixedly held on the barrel 8 by engaging claws 15 and 16 formed in the barrel 8. In addition, the mount 12 is so locked by a locking claw 17 formed in the barrel 8 that it does not slip off the engaging claws 15 and 16.

Although the engaging claws 15 and 16 and the locking claw 17 are provided in the upper right front part in the longitudinal direction of the barrel 8 (on the right side as viewed from a muzzle 9), similar engaging claws 18 and 19 and locking claw 20 are provided in the upper left part of the barrel 8 (see FIG. 3). The engaging claws 15 and 16 and the locking claw 17 and the engaging claws 18 and 19 and the locking claw 20 are provided in positions symmetrical with respect to an optical axis of the barrel 8.

As shown in FIG. 4, the gunsight 10 may be detached from the engaging claws 15 and 16 and mounted on the engaging claws 18 and 19. In the shooting scope according to the present embodiment, a position where the gunsight 10 is mounted can be thus changed to the most suitable position depending on whether a user of the shooting scope is right-handed or left-handed. Consequently, it is possible to obtain a shooting scope significantly superior in operability.

Figure 5:
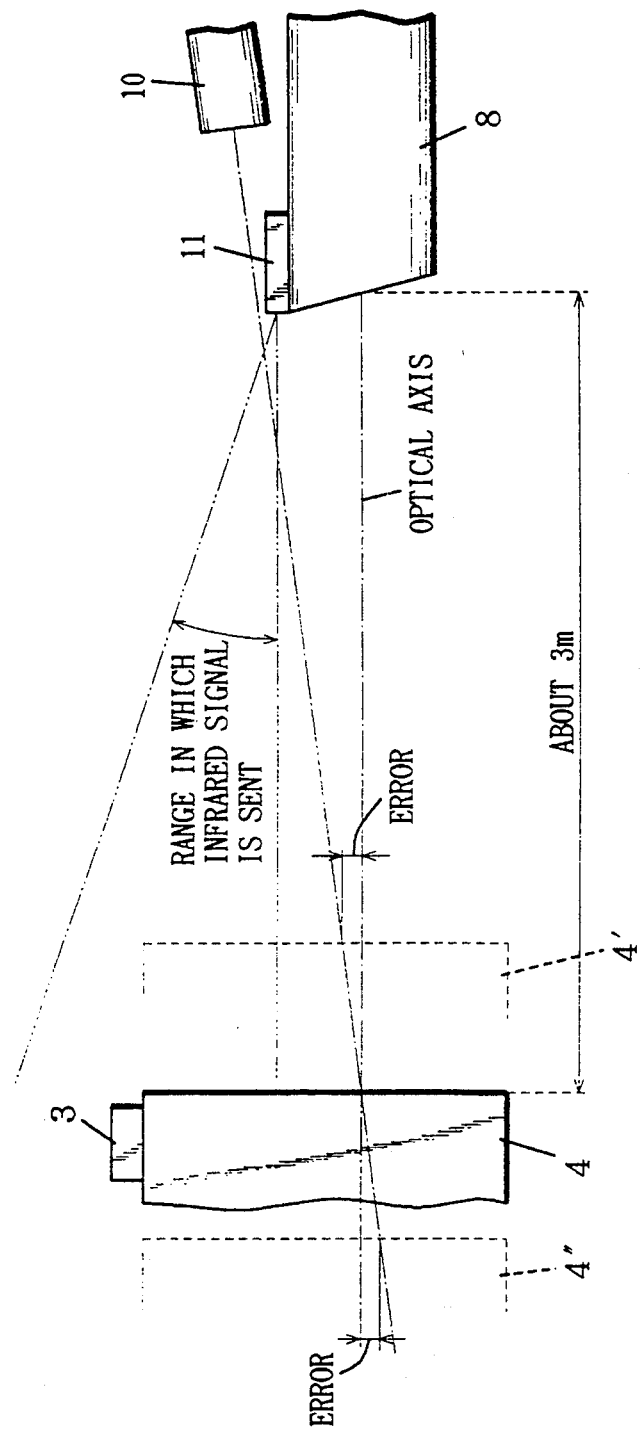
FIG. 5 is a diagram showing the relationship between an optical axis of the barrel of the shooting scope shown in FIG. 1 and a sighting axis of a gunsight.

As shown in FIG. 5, the shooting scope 5 according to the present embodiment is generally used in a position close to, that is, spaced approximately 3 meters apart from the television receiver 4. Consequently, if a sighting axis and the optical axis are parallel to each other, coordinates on the television screen of an extension line of the sighting axis and an extension line of the optical axis are considerably shifted. In the present embodiment, therefore, the shooting scope 5 is so constructed that when the gunsight 10 is mounted on the barrel 8, the gunsight 10 makes a predetermined angle to the optical axis such that the sighting axis crosses an optical axis of a condenser lens 31 (see FIG. 6) provided within the barrel 8 to form an intersection a predetermined distance (for example, approximately 3 meters) ahead of the muzzle 9. More specifically, the gunsight 10 is so selected that the sighting axis in a case where the foresight 14 is looked into from the scope 13 is slightly downward with respect to the bottom surface of the mount 12, and is mounted on the upper part of the barrel 8 and a position at an angle of 45° on the left or right side to the vertical axis passing through the optical axis. Consequently, whichever of the engaging claws 15 and 16 and the engaging claws 18 and 19, that is, whichever of the upper left and the upper right of the barrel 8 is a position where the gunsight 10 is mounted, the optical axis and the sighting axis can be made to cross (or concentrated on one point) on the screen of the television receiver 4 a predetermined distance ahead of the muzzle 9, thereby to make it possible to shoot the target accurately and with high precision. In addition, since the gunsight 10 is detachably constructed in the position at an angle of 45° on the right or left side to the optical axis, a player can accurately aim at the target irrespective of the dominant hand, the dominant eye and the size of a player's face, thereby to make it possible to further improve the operability. When the distance between the shooting scope 5 and the television receiver 4 is varied as represented by dotted lines 4' and 4" in FIG. 5 from the distance presumed (approximately 3 meters) as a result of inclining the sighting axis of the gunsight 10 from the optical axis of the barrel 8 as described above, the coordinate position on the television screen of the extension line of the optical axis and the extension line of the sighting axis is shifted. The present embodiment is so constructed that the shift of the coordinate position, that is, an error is corrected according to the distance between the shooting scope 5 and the television receiver 4.

Figure 6:
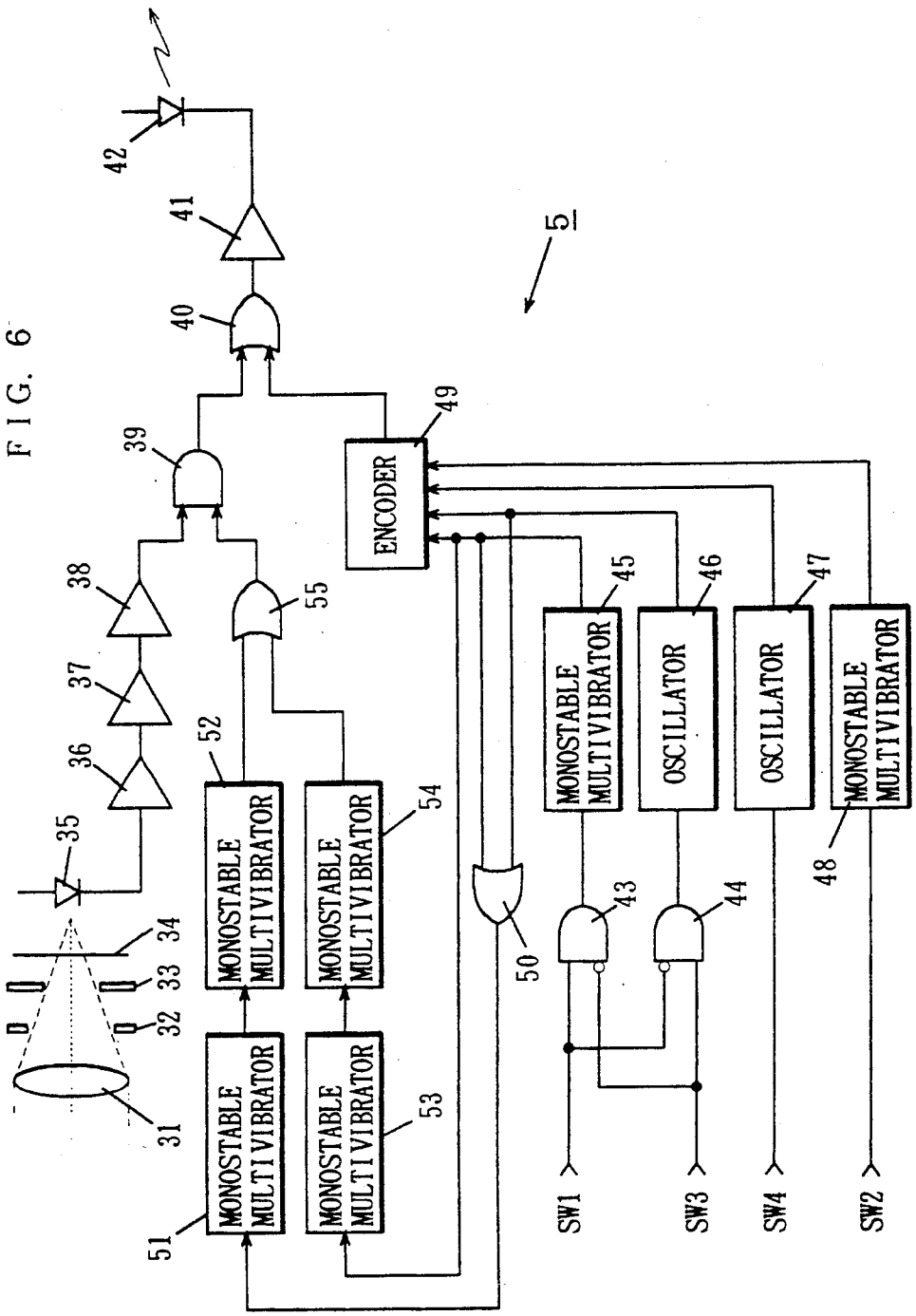
FIG. 6 is a block diagram showing the structure of the shooting scope shown in FIG. 1.

FIG. 6 is a block diagram showing the inner structure of the shooting scope 5 shown in FIG. 1. In FIG. 6, the shooting scope 5 comprises a lens 31, slits 32 and 33, an infrared cut filter 34, a light receiving element 35, a pre-amplifier 36, a high-pass filter 37, a waveform shaping circuit 38, an AND gate 39, an OR gate 40, a driver 41, infrared LED (light emitting diode) 42, AND gates 43 and 44, a monostable multivibrator 45, an oscillator 46, an oscillator 47, a monostable multivibrator 48, an encoder 49, monostable multivibrators 51 to 54, and a OR gate 55.

The lens 31 is provided in the vicinity of the muzzle 9 and forms an image of a target displayed on the television receiver 4 on the light receiving element 35. The slits 32 and 33 are used for eliminating undesired disturbance light from the exterior, and the inner diameter of the slit 33 is selected to be smaller than the inner diameter of the slit 32. The infrared cut filter 34 is used for preventing infrared rays from being incident on the light receiving element 35. The light receiving element 35 includes, for example, a photodiode, and detects a light signal from the target displayed on the television receiver 4 and converts the same into an electric signal. A detection signal of the light receiving element 35 is amplified by the pre-amplifier 36 and then, is applied to the high-pass filter 37. The high-pass filter 37 eliminates disturbance signals other than objective signals, for example, signals of sunlight, illuminating light and the like. An output of the high-pass filter 37 is subjected to waveform shaping by the waveform shaping circuit 38 and is converted into a pulse signal and then, is applied to the AND gate 39.

An output of the AND gate 39 is applied to the driver 41 through the OR gate 40. The driver 41 is used for driving the infrared LED 42. The infrared LED 42 is provided inside of an infrared device 11 and sends out an infrared signal to the receiver 3.

A trigger signal based on an operation of the trigger switch SW1 is applied to the AND gate 43 and is applied to the AND gate 44 after being inverted. A continuous shooting signal based on the power supply/continuous shooting switch SW3 is applied to the AND gate 44 and is applied to the AND gate 43 after being inverted. A cursor signal based on the cursor switch SW4 is applied to the oscillator 47. A pause signal based on the pause switch SW2 is applied to the monostable multivibrator 48. Respective outputs of the monostable multivibrator 45, the oscillators 46 and 47 and the monostable multivibrator 48 are applied to the encoder 49. The encoder 49 encodes the respective signals inputted. An output of the encoder 49 is applied to the OR gate 40.

The output of the monostable multivibrator 45 is further applied to the monostable multivibrator 53 and is applied to the monostable multivibrator 51 through the OR gate 50. The output of the oscillator 46 is further applied to the monostable multivibrator 51 through the OR gate 50. Outputs of the monostable multivibrators 51 and 53 are respectively applied to the monostable multivibrators 52 and 54. Outputs of the monostable multivibrators 52 and 54 are applied to the AND gate 39 through the OR gate 55.

Description is now made of the operation of the shooting scope 5. First, a player carries the shooting scope 5 on his shoulder, and looks into the gunsight 10 to sight a target on the television screen. At this time, the lens 31 collects light on an image on the television screen in the vicinity of the optical axis of the barrel 8 and forms the image on the light receiving element 35. Consequently, the light receiving element 35 converts a light signal from the image in the vicinity of a portion to which the muzzle 9 is directed on the television screen (not the entire screen) into an electric signal and outputs the same.

Figure 7:
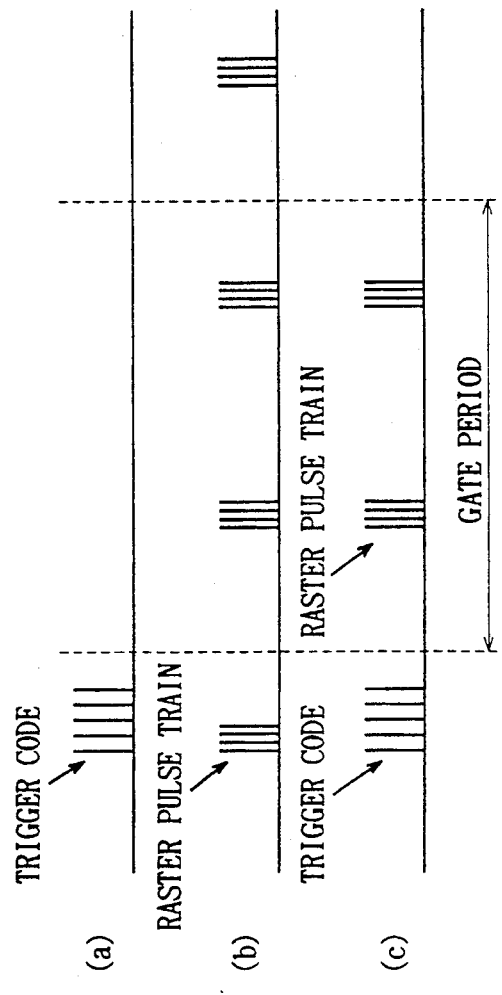
FIG. 7 is a timing chart for explaining the operation of the shooting scope.

The output of the light receiving element 35 is subjected to amplification, noise removal and waveform shaping by the pre-amplifier 36, the high-pass filter 37 and the waveform shaping circuit 38 and is converted into a pulse signal. The light receiving element 35 outputs a detection signal every time a scanning line, that is, a raster passes through a region where the lens 31 collects light on the television screen. Accordingly, an output of the waveform shaping circuit 38 becomes a pulse train of raster pulses having a period according to the horizontal frequency of a television video signal (hereinafter referred to as a raster pulse train). This raster pulse train is shown in FIG. 7 (b).

The player depresses the trigger switch SW1 when sighting of the target displayed on the television receiver 4 is terminated. Correspondingly, a trigger signal at a high level is output from this trigger switch SW1 and is applied to the monostable multivibrator 45 through the AND gate 43. The monostable multivibrator 45 outputs one pulse signal in response to this trigger signal. This pulse signal is applied to the encoder 49 to be encoded. As a result, the encoder 49 generates a trigger code as shown in FIG. 7 (a). This trigger code is applied to the driver 41 through the OR gate 40. The driver 41 drives the infrared rays LED 42 on the basis of the trigger code applied. Consequently, a trigger code serving as an infrared signal is outputted from the infrared LED 42, as shown in FIG. 7 (c).

The output pulse signal of the monostable multivibrator 45 is further applied to the monostable multivibrators 51 and 53. Outputs of the monostable multivibrators 51 and 53 are respectively applied to the monostable multivibrators 52 and 54. The monostable multivibrators 52 and 54 output a gate pulse having a width represented by dotted lines in FIG. 7 (for example, a width corresponding to two frame periods). This gate pulse is applied to the AND gate 39 through the OR gate 55. Consequently, the AND gate 39 is opened in a time period during which this gate pulse is applied to pass the raster pulse train applied from the waveform shaping circuit 38. The raster pulse train passing through the AND gate 39 is applied to the driver 41 through the OR gate 40. Consequently, the infrared LED is driven according to the raster pulse train, and the raster pulse train serving as an infrared signal is outputted from the infrared LED (see FIG. 7 (c)).

On the other hand, when the power supply/continuous shooting switch SW3 is slid to a continuous shooting position or when the cursor switch SW4 is depressed, a pulse signal having a constant period is output from the oscillator 46 or 47. In this case, therefore, the encoder 49 outputs a trigger code for each constant period. On the other hand, the monostable multivibrators 52 and 54 output the above described gate pulse for each constant period. As a result, the infrared LED 42 transmits the trigger code and the raster pulse train as shown in FIG. 7 (c) repeatedly for each constant period.

Figure 8:
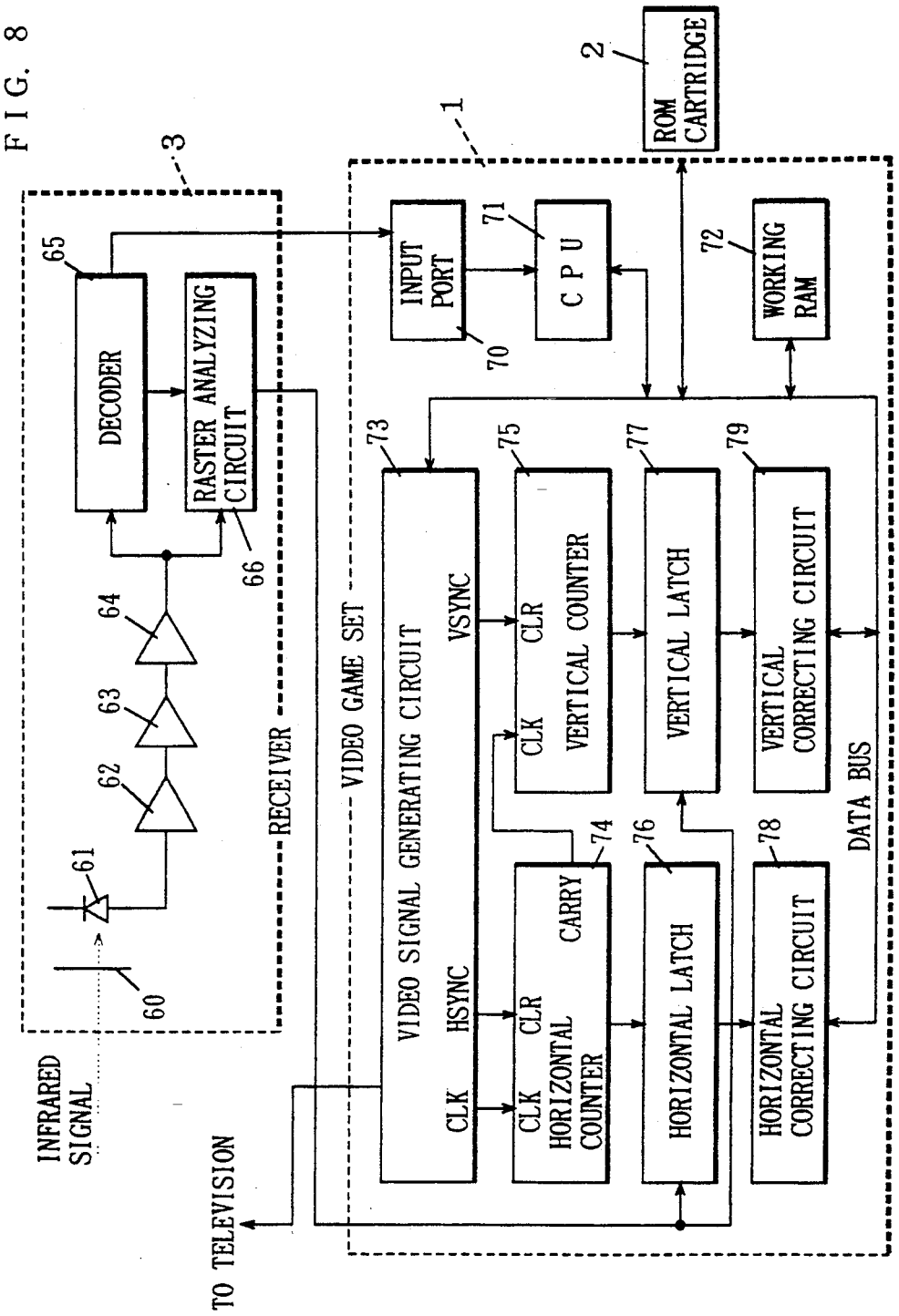
FIG. 8 is a block diagram showing the structures of a receiver and a video game set shown in FIG. 1.

FIG. 8 is a block diagram showing the structures of the video game set 1 and the receiver 3 shown in FIG. 1. In FIG. 8, the receiver 3 comprises an infrared pass filter 60, a light receiving element 61, a pre-amplifier 62, a high-pass filter 63, a waveform shaping circuit 64, a decoder 65, and a raster analyzing circuit 66. The infrared pass filter 60 is a filter for passing only infrared rays. Visible light is removed by this infrared pass filter 60, so that only the infrared signal from the above described infrared LED (see FIG. 6) is applied to the light receiving element 61. The decoder 65 is a circuit for decoding the trigger code sent from the shooting scope 5 and applying the same to the video game set 1. The raster analyzing circuit 66 is a circuit for extracting only a raster pulse from the signal detected by the light receiving element 61.

The video game set 1 comprises an input port 70, a CPU 71, a working RAM 72, a video signal generating circuit 73, a horizontal counter 74, a vertical counter 75, a horizontal latch 76, a vertical latch 77, a horizontal correcting circuit 78, and a vertical correcting circuit 79. The input port 70 is a circuit for applying an output signal of the above described decoder 65 to the CPU 71. The CPU 71 is a circuit for performing various control operations on the basis of program data stored in a ROM cartridge 2. The working RAM 72 is a memory for storing various data required by the CPU 71, e.g., for controlling processing. The video signal generating circuit 73 is a circuit for generating a video signal for a game in accordance with the data applied from the CPU 71.

The horizontal counter 74 counts video clock pulses (clock pulses in a dot cycle) applied from the video signal generating circuit 73 and is reset by a horizontal synchronizing signal (HSYNC) applied from the video signal generating circuit 73. The vertical counter 75 counts a carry signal of the horizontal counter 74 and is reset by a vertical synchronizing signal (VSYNC) from the video signal generating circuit 73. The horizontal latch 76 latches a counted value of the horizontal counter 74 in response to a latch pulse from the raster analyzing circuit 66. The vertical latch 77 latches a counted value of the vertical counter 75 in response to the latch pulse from the raster analyzing circuit 66. The horizontal correcting circuit 78 is a circuit for correcting an output of the horizontal latch 76. The vertical correcting circuit 79 is a circuit for correcting an output of the vertical latch 77.

Figure 9:
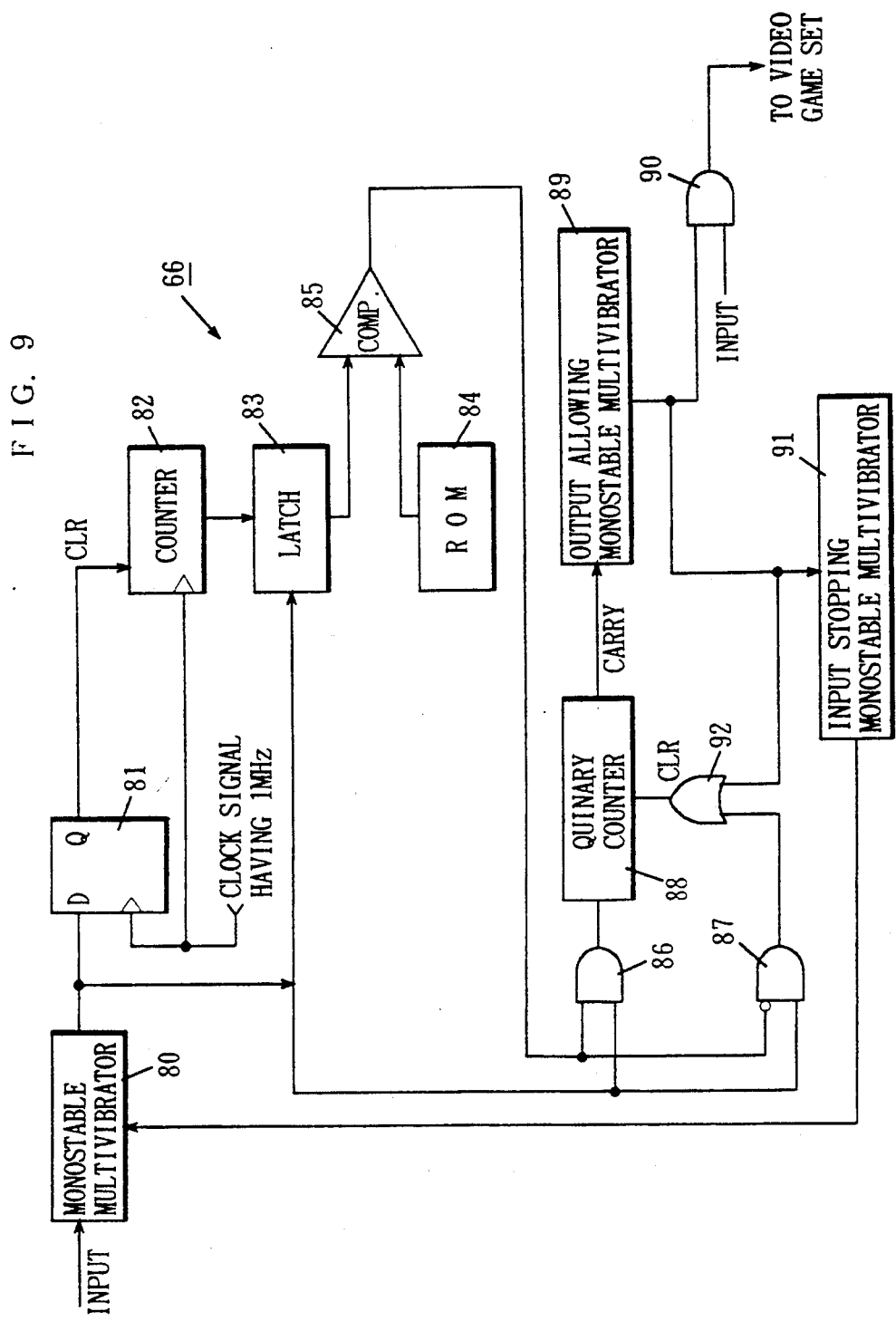
FIG. 9 is a block diagram showing the more detailed structure of a raster analyzing circuit shown in FIG. 8.

FIG. 9 is a block diagram showing the more detailed structure of the raster analyzing circuit 66 shown in FIG. 8. In FIG. 9, the raster analyzing circuit 66 comprises a monostable multivibrator 80, a D-type flip-flop 81, a counter 82, a latch 83, a ROM 84, a comparator 85, AND gates 86 and 87, a quinary counter 88, an output allowing monostable multivibrator 89, an AND gate 90, and an input stopping monostable multivibrator 91.

Description is now made of the operation of the receiver 3 shown in FIG. 8. The infrared LED 42 in the shooting scope 5 transmits control data based on the infrared signal as shown in FIG. 7 (c) toward the receiver 3. This infrared signal is applied to the light receiving element 61 after unnecessary visible light is removed by the infrared pass filter 60. An output of the light receiving element 61 is respectively subjected to amplification, noise removal and waveform shaping in the pre-amplifier 62, the high-pass filter 63 and the waveform shaping circuit 64 and then, is applied to the decoder 65 and the raster analyzing circuit 66. The decoder 65 decodes the trigger code included in the infrared signal and transmits the result of the decoding to the video game set 1. The input port 70 outputs the result of the decoding of the decoder 65 to the CPU 71. On the other hand, the raster analyzing circuit 66 analyzes a raster pulse train included in the waveform shaping circuit 64, extracts the sixth pulse from the raster pulse train and outputs the same.

Figure 10:
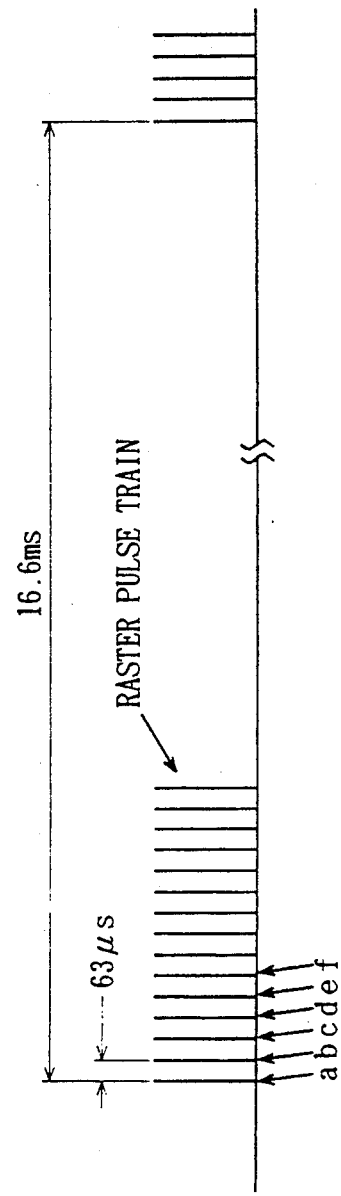
FIG. 10 is a timing chart for explaining the operation of the raster analyzing circuit shown in FIG. 9.

Referring now to FIGS. 9 and 10, description is made of the more detailed operation of the raster analyzing circuit 66. When the raster pulse train as shown in FIG. 10 is applied to the monostable multivibrator 80, the monostable multivibrator 80 is first initiated by a raster pulse a. Correspondingly, the monostable multivibrator 80 outputs one pulse having a predetermined pulse width. This pulse is delayed by 1 $\mu$s by the D-type flip-flop 81 and then, is applied to the counter 82 as a clear signal. Consequently, the counter 82 is cleared. Thereafter, the counter 82 counts clock pulses having a frequency of 1 MHz.

When a raster pulse b is then input, the monostable multivibrator 80 generates one pulse again. The latch 83 latches a counted value of the counter 82 in response to this pulse. The comparator 85 compares a value latched in the latch 83 with a value stored in the ROM 84. The ROM 84 stores a value of "63". When the value latched in the latch 83 is "63", that is, when the counter 82 counts 63 clock pulses having a frequency of 1 MHz between the raster pulse a and the raster pulse b (when the period between the raster pulse a and the raster pulse b is 63 $\mu$s), the comparator 85 outputs a coincidence signal at a high level. This coincidence signal passes through the AND gate 86 and increments the quinary counter 88.

Subsequently, the raster pulses c, d, e, f, . . . are sequentially input, to repeat the same operations as described above. Correspondingly, the quinary counter 88 is incremented every time one pulse is inputted. When the pulse f is inputted, the quinary counter 88 outputs a carry signal, to initiate the output allowing monostable multivibrator 89. Correspondingly, the output allowing monostable multivibrator 89 outputs one pulse. As a result, the AND gate 90 passes the pulse f and outputs the same to the video game set 1. At this time, the input stopping monostable multivibrator 91 is initiated by the output pulse of the output allowing monostable multivibrator 89. Consequently, one pulse is output from the input stopping monostable multivibrator 91. The monostable multivibrator 80 is inhibited from being initiated until the time when it is assumed that a raster pulse train in the succeeding frame is inputted in response to this pulse. Furthermore, the output pulse of the output allowing monostable multivibrator 89 is applied to the quinary counter 88 through the OR gate 92 as a clear signal. As a result, the quinary counter 88 is cleared.

By the foregoing operations, the sixth pulse f in the raster pulse train is extracted and is applied to the video game set 1. More specifically, in the present embodiment, the sixth pulse f located in an approximately central part out of the plurality of raster pulses included in the raster pulse train is extracted as a horizontal scanning line which is shot by the shooting scope 5.

The foregoing operations are performed when no noise is included in an input signal. When noise is included in an input signal by disturbance light from the exterior or the like, however, the period of pulses counted by the counter 82 deviates from 3 μs. As a result, the comparator 85 outputs no coincidence signal. Therefore, the AND gate 87 passes the input pulse from the monostable multivibrator 80 and outputs the same to the quinary counter 88 through the OR gate 92 as a clear signal. As a result, the quinary counter 88 is cleared before outputting a carry signal. Therefore, the output allowing monostable multivibrator 89 inhibits the input pulse f from being outputted. In the present embodiment, therefore, it is possible to prevent noise due to disturbance light or the like from being erroneously detected as a raster pulse.

Figure 11:
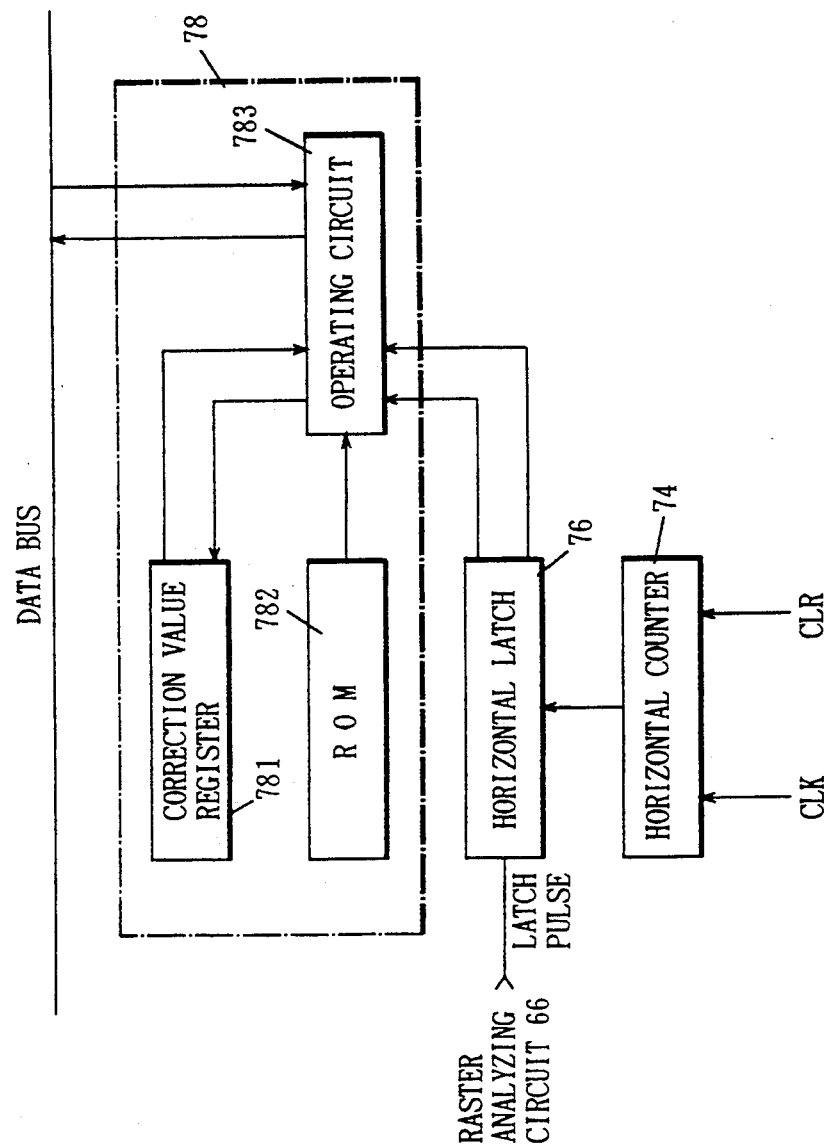
FIG. 11 is a block diagram showing the more detailed structure of a horizontal correcting circuit shown in FIG. 8.

FIG. 11 is a block diagram showing the more detailed structure of the horizontal correcting circuit 78 shown in FIG. 8. In FIG. 11, the horizontal correcting circuit 78 comprises a correction value register 781, a ROM 782, and an operating circuit 783.

Figure 12:
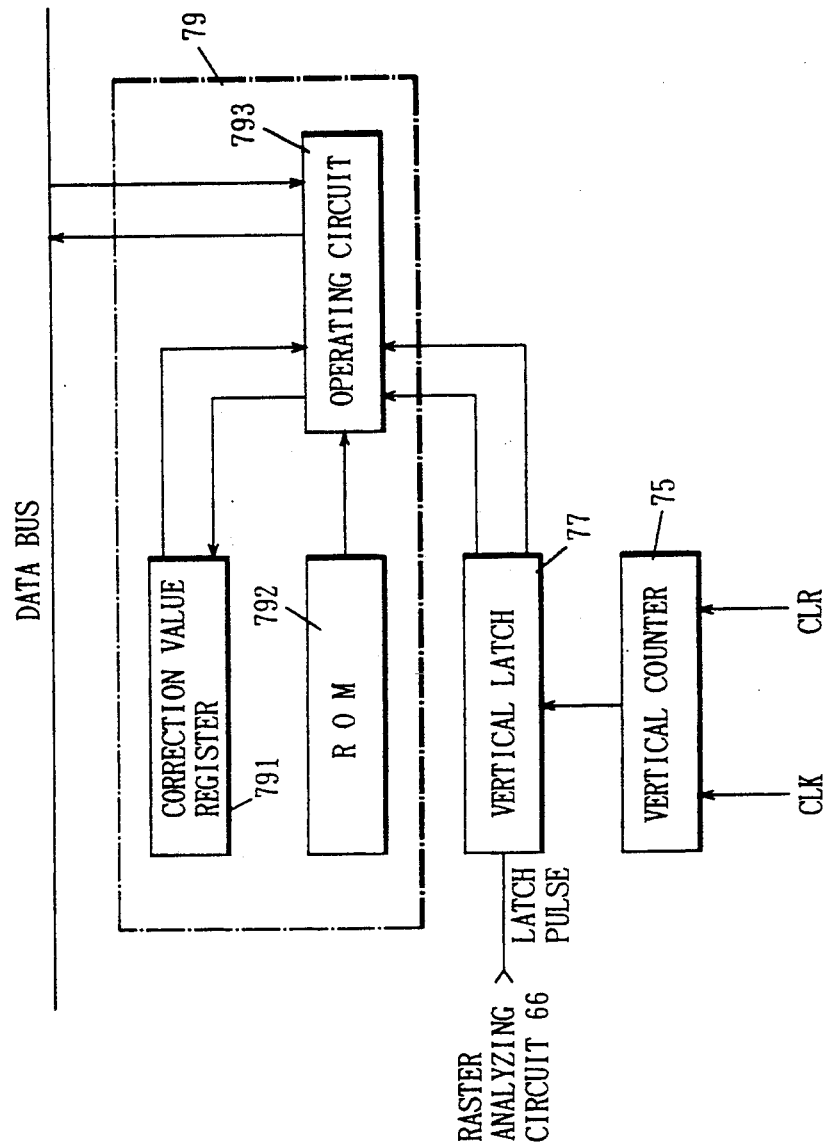
FIG. 12 is a block diagram showing the more detailed structure of a vertical correcting circuit shown in FIG. 8.

FIG. 12 is a block diagram showing the more detailed structure of the vertical correcting circuit 79 shown in FIG. 8. In FIG. 12, the vertical correcting circuit 79 comprises a correction value register 791, a ROM 792, and an operating circuit 793.

Figure 13:
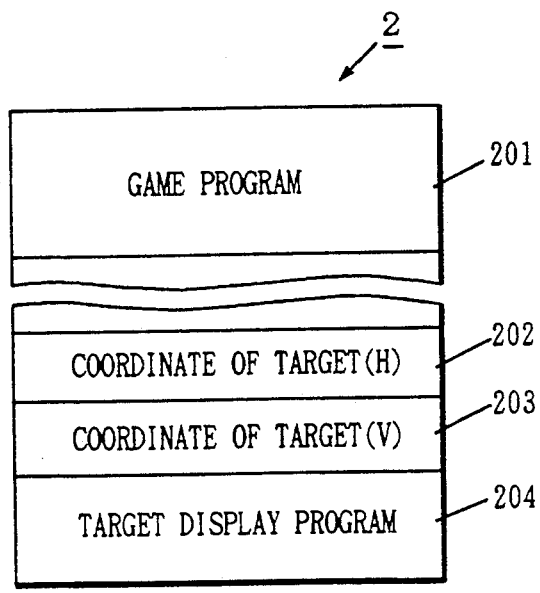
FIG. 13 is an illustration showing a memory map of a ROM contained in a ROM cartridge shown in FIG. 8.

FIG. 13 is an illustration showing a memory map of a ROM contained in the ROM cartridge 2 shown in FIG. 8. In FIG. 13, the ROM contained in the ROM cartridge 2 comprises storage areas 201 to 204. The storage area 201 stores a game program for gam processing. The storage area 202 stores horizontal coordinate data of a target and a sighting mark to be displayed on the television receiver 4. The storage area 203 stores vertical coordinate data of the target and the sighting mark to be displayed on the television receiver 4. The storage area 204 stores a program for displaying the target on the television receiver 4.

Figure 14:
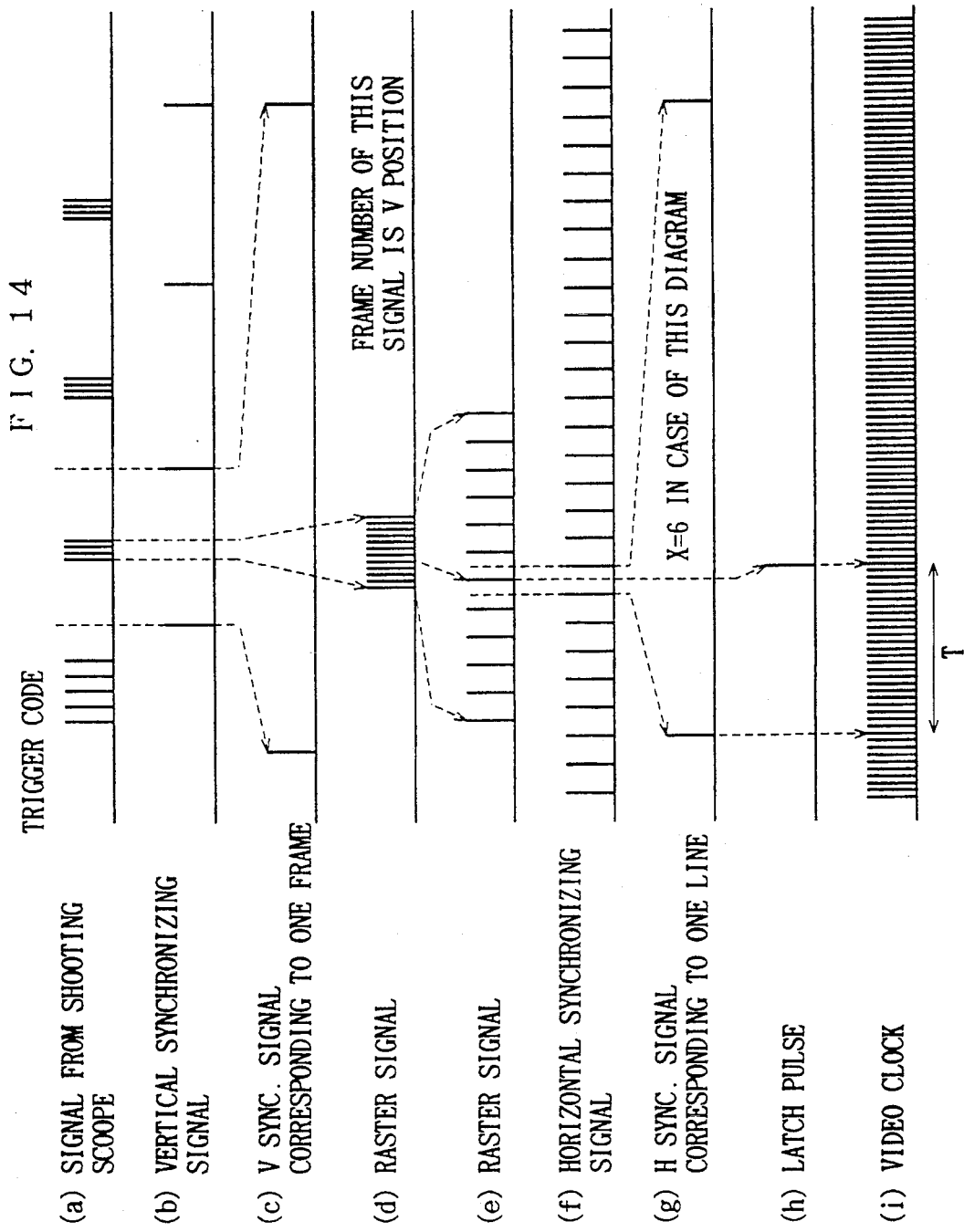
FIG. 14 is a timing chart for explaining a detecting operation of a shot coordinate position which is performed in the video game set shown in FIG. 8.

Referring now to a timing chart of FIG. 14, description is made of the principle of a detecting operation of a coordinate position which is shot by the shooting scope 5 on the screen of the television receiver 4. When the receiver 3 receives a trigger code and a raster pulse train as shown in FIG. 14 (a), the raster analyzing circuit 66 extracts the sixth raster pulse included in the raster pulse train and outputs the same, as described above. This sixth raster pulse is applied to the horizontal latch 76 and the vertical latch 77 as a latch pulse. The horizontal latch 76 and the vertical latch 77 latch the counted value of the horizontal counter 74 and the counted value of the vertical counter 75 in response to this latch pulse. The counted values of the horizontal counter 74 and the vertical counter 75 respectively correspond to a horizontal position and a vertical position of the raster. Consequently, the counted values latched in the horizontal latch 76 and the vertical latch 77 correspond to a horizontal position and a vertical position which are shot by the shooting scope 5 on the screen of the television receiver 4. More specifically, the number of horizontal synchronizing signals included in a period from a vertical synchronizing signal in a vertical scanning period immediately before the present vertical scanning period to the sixth raster pulse extracted by the raster analyzing circuit 66 is latched in the vertical latch 77. On the other hand, the number of video clock pulses included in a period T from a horizontal synchronizing signal in a horizontal scanning period immediately before the present horizontal synchronizing period to the sixth raster pulse extracted by the raster analyzing circuit 66 is latched in the horizontal latch 76.

Figure 15:
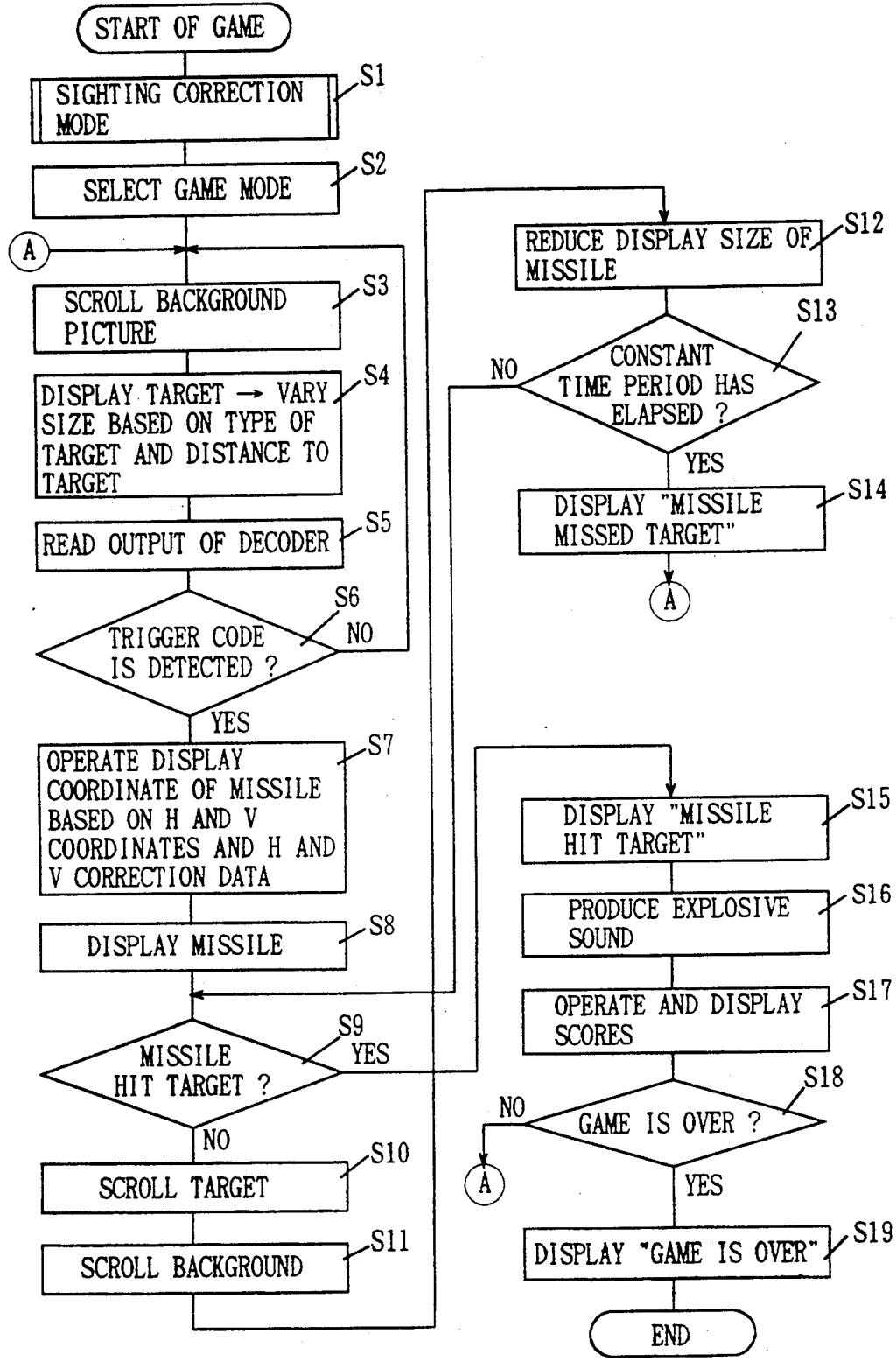
FIG. 15 is a flow chart for explaining the operation of the video game set shown in FIG. 8.
Figure 16:
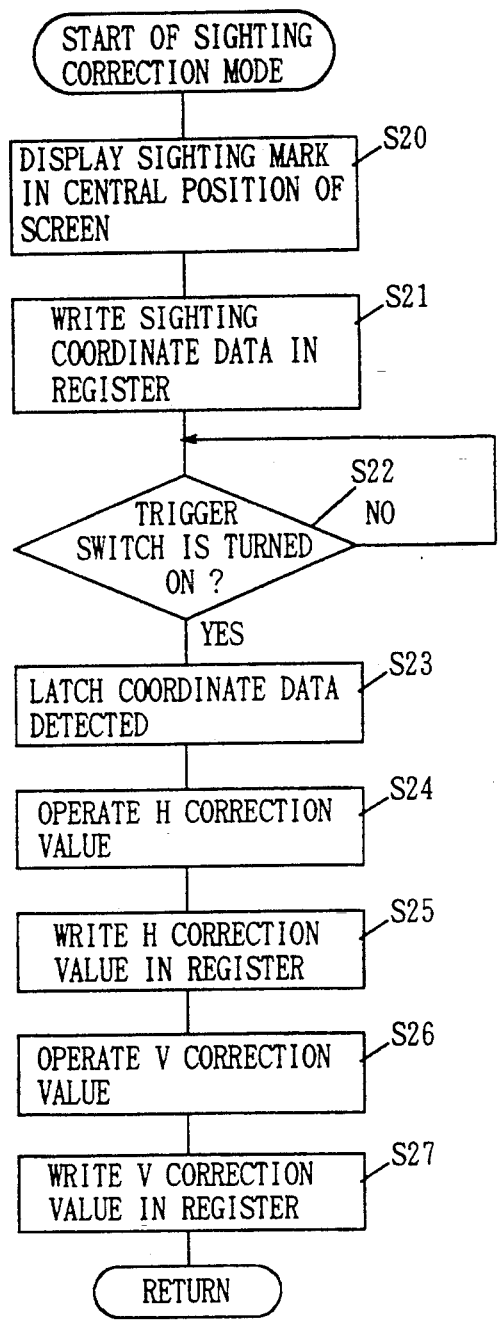
FIG. 16 is a flow chart showing the more detailed operation of a sighting correction mode subroutine shown in FIG. 15.

Referring now to flow charts of FIGS. 15 and 16, description is now made of the operation of the video game set 1. In the step S1 shown in FIG. 15, a sighting correction mode is first executed. This sighting correction mode is for displaying a sighting mark on the television screen before starting a game, and finding an error between a position which is shot by a player of the sighting mark and a central position of the sighting mark as a correction value. The details of such a sighting correction mode subroutine are shown in FIG. 16.

Figure 17:
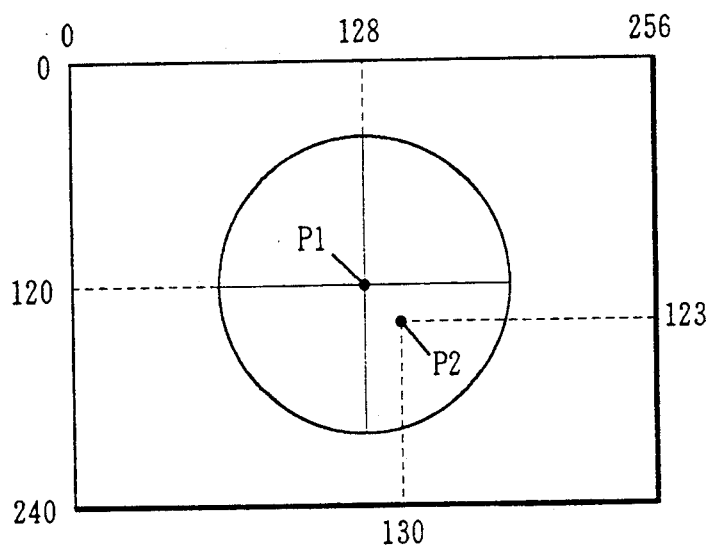
FIG. 17 is an illustration showing one example of a sighting mark displayed on a television receiver.

Referring now to FIG. 16, in the step S20, the CPU 71 displays a sighting mark as shown in FIG. 17 in a central position of the screen of the television receiver 4. This operation in the step S20 is achieved by the CPU 71 reading out the target display program stored in the storage area 204 in the ROM cartridge 2 and executing the same. The program then proceeds to the step S21. In the step S21, the operating circuit 783 shown in FIG. 11 and the operating circuit 793 shown in FIG. 12 respectively read out sighting coordinate data stored in the ROMs 782 and 792 and store the data in an internal register. More specifically, the ROM 782 stores a horizontal coordinate position "128" of a center point P1 of the sighting mark, and the ROM 792 stores a vertical coordinate position "120" of the center point P1. The operating circuits 783 and 793 respectively accept the horizontal coordinate position and the vertical coordinate position of this center point P1 and hold them in the internal register.

The program then proceeds the step S22. In the step S22, it is judged whether or not the trigger switch SW1 is turned on. If the trigger switch SW1 is turned on, the program proceeds to the step S23. In the step S23, the horizontal latch 76 and the vertical latch 77 respectively latch horizontal coordinate data and vertical coordinate data corresponding to a point P2 which is shot by the shooting scope 5 on the television screen in response to the latch pulse from the raster analyzing circuit 66. In an example shown in FIG. 17, a horizontal coordinate position of the point P2 is "130", and a vertical coordinate position thereof is "123". The program then proceeds the step S24. In the step S24, the operating circuit 783 operates a correction value in the horizontal direction. This operation of the correction value in the horizontal direction is performed by subtracting the horizontal coordinate data "128" of the center point P1 of the sighting mark from the horizontal coordinate data "130" of the point P2 latched in the horizontal latch 76. The program then proceeds to the step S25. In the step S25, the correction value in the horizontal direction which is operated in the step S24 is written in the correction value register 781. The program then proceeds to the step S26. In the step S26, the operating circuit 793 operates a correction value in the vertical direction. This operation of the correction value in the vertical direction is performed by subtracting the vertical coordinate data "120" of the center point P1 of the sighting mark from the vertical coordinate data "123" of the point P2 latched in the vertical latch 77. The program then proceeds to the step S27. In the step S27, the correction value in the vertical direction which is operated in the step S26 is written in the correction value register 791. Thereafter, the program is returned to the main flow shown in FIG. 15.

Referring to FIG. 15 again, if a game mode is selected in the step S2, the CPU 71 reads out the game program from the storage area 201 in the ROM cartridge 2 and scrolls a background picture on the television receiver 4 in the step S3. The program then proceeds to the step S4. In the step S4, the CPU 71 displays a target on the television receiver 4. This display of the target is performed on the basis of the horizontal coordinate data and the vertical coordinate data of the target stored in the storage areas 202 and 203 in the ROM cartridge 2 and the target display program stored in the storage area 204 therein. At this time, the display size of the target is varied on the basis of the type of target and the distance to the target. For example, even if targets are of the same type, the targets are so displayed that the shape of the target passing through a distant place is smaller than the target passing through a near place. The program then proceeds to the step S5. In the step S5, the CPU 71 reads an output of the decoder 65 through the input port 70. Subsequently, the program proceeds to the step S6. In the step S6, the CPU 71 judges whether or not the trigger switch SW1 is turned on, that is, the trigger code is detected by the decoder 65. At this time, when it is judged that the trigger switch SW1 is not turned on, the CPU 71 is returned to the operation in the step S3 again.

On the other hand, if it is judged in the step S6 that the trigger switch SW 1 is turned on, the program proceeds to the step S7. In the step S7, the operating circuits 783 and 793 operate display coordinates of a missile which is one example of a projectile shot from the shooting scope 5 on the basis of the horizontal and vertical coordinate data latched in the horizontal latch 76 and the vertical latch 77 and horizontal and vertical correction values stored in the correction value registers 781 and 791. More specifically, the operating circuit 783 subtracts the correction value stored in the correction value register 781 from the horizontal coordinate data latched in the horizontal latch 76 (horizontal coordinate data in a position which is shot by the player on the television screen), and outputs the result of the subtraction to the CPU 71. Similarly, the operating circuit 793 subtracts the correction value stored in the correction value register 791 from the vertical coordinate data latched in the vertical latch 77 (vertical coordinate data in a position which is shot by the player on the television screen) and outputs the result of the subtraction to the CPU 71. The program then proceeds to the step S8. In the step S8, the CPU 71 displays the missile on the television screen on the basis of display coordinate data of the missile which is applied from the operating circuits 783 and 793.

The program then proceeds to the step S9. In the step S9, it is judged whether or not the missile displayed in the step S8 hit the target displayed on the television screen. At this time, unless it hit the target, the program proceeds to the step S10. In the step S10, the CPU 71 scrolls the target. The program then proceeds to the step S11. In the step S11, the CPU 71 scrolls a background picture. The program then proceeds to the step S12. In the step S12, the CPU 71 further reduces the display size of the missile so as to indicate that the missile flew to the distance without hitting the target. The program then proceeds to the step S13. In the step S13, the CPU 71 judges whether or not a constant time period has elapsed. Unless a constant time period has elapsed, the operations in the steps S9 to S12 are repeated again. On the other hand, if a constant time period has elapsed, the program proceeds to the step S14. In the step S14, the CPU 71 displays on the television receiver 4 the fact that the missile missed the target. Thereafter, the program is returned to the operation in the step S3.

On the other hand, if it is judged in the step S9 that the missile hit the target, the program proceeds to the step S15. In the step S15, the CPU 71 displays on the television receiver 4 the fact that the missile hit the target. The program then proceeds to the step S16. In the step S16, the CPU 71 produces an explosive sound from the television receiver 4. The program then proceeds to the step S17. In the step S17, the CPU 71 operates and displays the score. The program then proceeds to the step S18. In the step S18, the CPU 71 judges whether or not the game is over. If the game is not over, the program is returned to the operation in the step S3 again. On the other hand, it is judged that the game is over, the program proceeds to the step S19. In the step S19, the CPU 71 displays on the television receiver 4 a state where the game is over. Thereafter, the operations are terminated.

Figure 18:
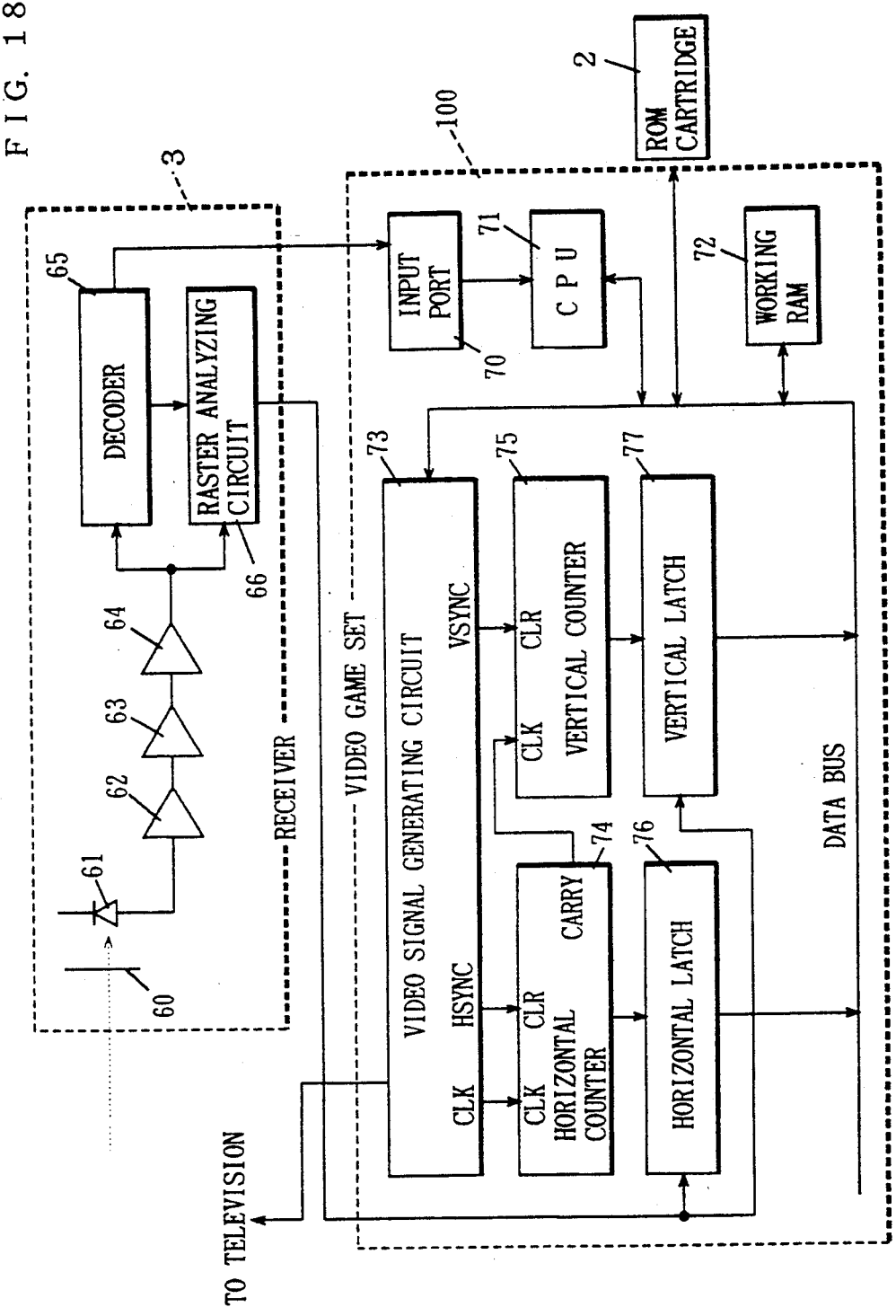
FIG. 18 is a block diagram showing the structures of a receiver and a video game set in another embodiment of the present invention.
Figure 19:
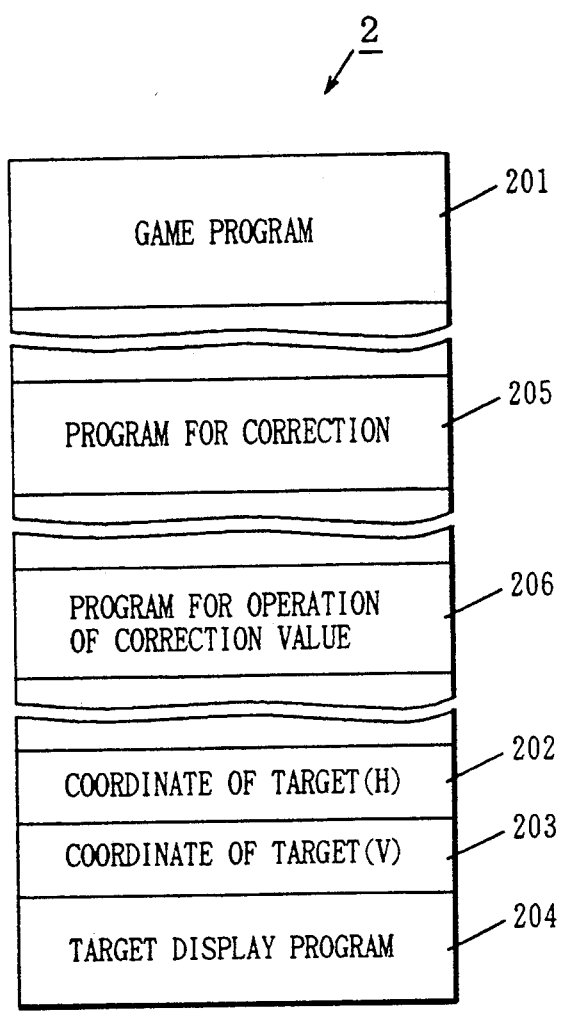
FIG. 19 is an illustration showing a memory map of a ROM contained in a ROM cartridge shown in FIG. 18.

FIG. 18 is a block diagram showing the structures of a receiver and a video game set according to another embodiment of the present invention. The structure of the receiver 3 is the same as the structure of the receiver 3 shown in FIG. 8. On the other hand, the structure of the video game set 100 shown in FIG. 18 differs from the structure of the video game set 1 shown in FIG. 8 in that the horizontal correcting circuit 78 and the vertical correcting circuit 79 are eliminated. Alternatively, correcting operations performed in the horizontal correcting circuit 78 and the vertical correcting circuit 79 are performed by program processing by a CPU 71. Therefore, storage areas 205 and 206 are added as shown in FIG. 19 to a ROM cartridge 2. The storage area 205 stores a program for realizing correction processing which is executed in the step S7 shown in FIG. 15. In addition, the storage area 206 stores a program for realizing an operation of a correction value which is executed in the sighting correction mode shown in FIG. 16.

Figure 20:
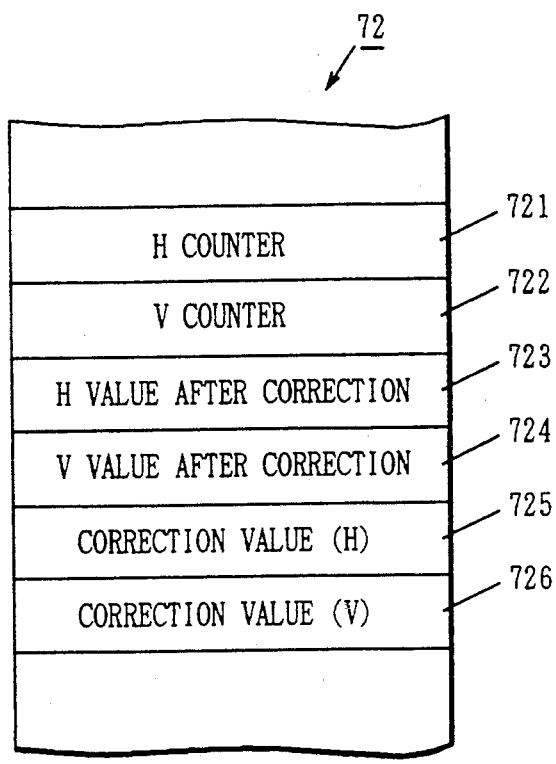
FIG. 20 is an illustration showing a memory map of a working RAM shown in FIG. 18.

FIG. 20 is an illustration showing a memory map of a working RAM 72 in the embodiment shown in FIG. 18. As shown in FIG. 20, the working RAM 72 comprises storage areas 721 to 726. The storage area 721 stores horizontal coordinate data in a shot coordinate position which is latched by a horizontal latch 76. The storage area 722 stores vertical coordinate data in the shot coordinate position which is latched by a vertical latch 77. The storage area 723 stores horizontal coordinate data in the shot coordinate position after being corrected which is operated by the CPU 71. The storage area 724 stores vertical coordinate data in the shot coordinate position after being corrected which is operated by the CPU 71. The storage area 725 stores a correction value in the horizontal direction which is operated in a sighting correction mode by the CPU 71. The storage area 726 stores a correction value in the vertical direction which is operated in the sighting correction mode by the CPU 71.

In the embodiment shown in FIG. 18 of the above described construction, the CPU 71 reads out the respective programs and coordinate data of a target from the respective storage areas 201 to 206 in the ROM cartridge 2 and process them, thereby to sequentially perform the operations shown in the flow charts of FIGS. 15 and 16 in approximately the same manner as described above.

As described in the foregoing, according to the present invention, the error between the reference mark displayed on the television screen before starting the game and the coordinate position which is shot by the shooting scope is previously operated as a correction value, and the coordinate position which is shot is corrected on the basis of this correction value while the game is played. Accordingly, more accurate correction can be always made, as compared with the conventional case where correction is made on the basis of a fixed correction value. Consequently, accurate sighting and hit determination are always allowed irrespective of the distance between the television receiver and the shooting scope, a player's habit, the variation of products, and the like.

Furthermore, according to the present invention, only the control signal is extracted from the pulse signals included in the receiving signal of the control signal receiving means to detect the shot coordinate data on the basis of the periodicity of the pulse signals. Accordingly, it is possible to prevent a malfunction due to disturbance light from the exterior or the like.

Additionally, according to the present invention, it is possible to obtain a new external storage used for the above described superior shooting game system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shooting game system for shooting a target displayed on a raster scan type display in a position spaced apart from the display to play a shooting game, comprising:
   game processing apparatus being connected to said display for performing processing for the shooting game;
   a shooting scope, having a light receiving axis, used in a position spaced apart from said display for shooting the target displayed on said display; and
   a sight attached on said shooting scope and defining a sighting axis having a predetermined angle with respect to the light receiving axis of said shooting scope, whereby said sighting axis intersects the light receiving axis of said shooting scope on said display when the distance between said shooting scope and said display is a predetermined distance;
   said shooting scope comprising;
   a trigger signal generator for generating a trigger signal in response to an operation performed by a player,
   a photoelectric converter for converting light from a position which is shot on said display into an electric signal which is synchronized with raster scanning of said display, and
   a control signal transmitter for transmitting by optical space communication a control signal based on the electric signal outputted from said photoelectric converting means to said game processing apparatus in response to said trigger signal from said trigger signal generator,
   said game processing apparatus comprising
   a control signal receiver for receiving the control signal transmitted from said control signal transmitter,
   shot coordinate position determining means for detecting a coordinate position which is shot by said shooting scope on said display on the basis of a raster coordinate position on said display at the time of receiving of said control signal by said control signal receiver,
   reference mark display controlling means for displaying a reference mark in a predetermined fixed position on said display before starting the game,
   an error detector for operating, when said reference mark is shot by said shooting scope, to detect an error between the coordinate position detected by said shot coordinate position detecting means and a coordinate position of said reference mark,
   an error storing device for storing the error detected by said error detector,
   a target display controller for displaying the target on said display while the game is played,
   correcting means for correcting, when the target on said display is shot by said shooting scope, the relative positional relationship between a coordinate position of the target and the coordinate position detected by said shot coordinate position detecting means on the basis of the error stored in said error storing device, and
   hit judging means for making a hit determination in a case where said target is shot by said shooting scope on the basis of said relative positional relationship after being corrected by said correcting means.

2. The shooting game system according to claim 1, wherein
   said correcting means corrects the coordinate position detected by said shot coordinate position detecting means on the basis of the error stored in said error storing device, and
   said hit judging means makes said hit determination by comparing the coordinate position corrected by said correcting means.

3. The shooting game system according to claim 1, wherein
   the control signal transmitted by said control signal transmitter includes a plurality of pulse signals which are synchronized with raster scanning of said display,
   said game processing apparatus further comprises control signal extracting means for extracting only the control signal transmitted by said control signal transmitter from a received signal of said control signal receiver on the basis of the periodicity of a plurality of pulse signals included in the received signal, and said shot coordinate position detecting means detects the coordinate position which is shot by said shooting scope on said display on the basis of the control signal extracted by said control signal extracting means.

4. The shooting game system according to claim 3, wherein said control signal extracting means extracts a n-th (where n is a predetermined integer) pulse signal out of the plurality of pulse signals included in the received signal of said control signal receiver as a pulse signal corresponding to raster scan light from the coordinate position which is shot by said shooting scope on said display, and said shot coordinate position detecting means detects the coordinate position which is shot by said shooting scope on said display on the basis of the n-th pulse signal extracted by said control signal extracting means.

5. The shooting game system according to claim 4, wherein said control signal extracting means comprises period detecting means for sequentially detecting the respective periods of the plurality of pulse signals included in the received signal of said control signal receiver, a coincidence detector for detecting the coincidence of the period detected by said period detecting means with the raster scanning period of said display, a counter for counting the number of times of detection of the coincidence of the periods by said coincidence detector, and pulse signal applying means for applying the n-th (where n is a predetermined integer) pulse signal included in the received signal of said control signal receiver to said shot coordinate position detecting means in response to the count of said counting means reaching a predetermined value.

6. The shooting game system according to claim 5, wherein, said control signal extracting means further comprises inhibiting means for inhibiting the pulse signal from being applied to said shot coordinate position detecting means in response to detection of the noncoincidence of the periods by said coincidence detector before the counted value of said counter reaches a predetermined value.

7. The shooting game system according to claim 1, wherein, said game processing apparatus includes image processing apparatus being connected to said display for displaying an image for the shooting game on said display and wherein said control signal receiver is connected to said image processing apparatus, and said shot coordinate position detecting means, said reference mark display controlling means, said error detector, said error storing device, said target display controlling means, said correcting means, and said hit judging means being contained in said image processing apparatus.

8. An external storage for use with a shooting game system comprising a game processing apparatus connected to a raster scan type display and a shooting scope used in a position spaced apart from said display and having a light receiving axis, for shooting a target displayed in said display and connected to said game processing apparatus, and wherein said shooting scope includes a sight attached on said shooting scope and defining a sighting axis having a predetermined angle with respect to the light receiving axis of said shooting scope, whereby said sighting axis intersects the light receiving axis of said shooting scope on said display when the distance between said shooting scope and said display is a predetermined distance;

said shooting scope comprising a trigger signal generator for generating a trigger signal in response to an operation performed by a player, a photoelectric converter for converting light from a position which is shot on said display into an electric signal which is synchronized with raster scanning of said display, and a control signal transmitter for transmitting by optical space communication a control signal based on the electric signal outputted from said photoelectric converter to said game processing apparatus in response to said trigger signal from said trigger signal generator, said game processing apparatus comprises information processing means for performing predetermined processing for the shooting game in accordance with program data applied from said external storage, and a control signal receiver for receiving the control signal transmitted from said control signal transmitter, said external storage comprising:

first program storing means storing first program data for detecting a coordinate position which is shot by said shooting scope on said display on the basis of said control signal received by said control signal receiver;

second program storing means storing second program data for displaying a reference mark at a predetermined fixed position on said display before starting a game;

third program storing means storing third program data for operating, when said reference mark is shot by said shooting scope, to detect an error between the coordinate position detected in accordance with said first program data and a coordinate position of said reference mark and for storing data indicative of said error in an error data storing means;

fourth program storing means storing fourth program data for displaying the target on said display while the game is played;

fifth program storing means storing fifth program data for correcting, when the target on said display is shot by said shooting scope, the relative positional relationship between a coordinate position of the target and the coordinate position detected in accordance with said first program data on the basis of the error stored in said error data storing means; and sixth program storing means storing sixth program data for making a hit determination in a case where said target is shot by said shooting scope on the basis of said relative positional relationship after being corrected in accordance with said fifth program data.

9. The external storage according to claim 8, wherein the fifth program data comprises program data for correcting the coordinate position detected in accordance with said first program data on the basis of the coordinate position stored in said error data storing means, and said sixth program data comprises program data for making said hit determination by comparing the coordinate position of said target with the coordinate position corrected in accordance with said fifth program data.

10. The external storage according to claim 8, wherein the control signal transmitted by said control signal transmitter comprising a plurality of pulse signals which are synchronized with the raster scanning of said display, said game processing apparatus further comprising control signal extracting means for extracting only the control signal transmitted by said control signal transmitter from a receiver on the basis of the periodicity of a plurality of pulse signals included in the receiver signal, and said first program data comprises program data for detecting the coordinate position which is shot by said shooting scope on said display on the basis of the control signal extracted by said control signal extracting means.

11. The external storage according to claim 10, wherein said control signal extracting means extracts a n-th (where n is a predetermined integer) pulse signal out of the plurality of pulse signals included in the received signal of said control signal receiver as a pulse signal corresponding to raster scan light from the coordinate position which is shot by said shooting scope on said display, and said first program data comprises program data for detecting the coordinate position which is shot by said shooting scope on said display on the basis of the n-th pulse signal extracted by said control signal extracting means.

12. The external storage according to claim 11, wherein said control signal extracting means comprises period detecting means for sequentially detecting the respective periods of the plurality of pulse signals included in the received signal of said control signal receiving means, a coincidence detector for detecting the coincidence of the period detected by said period detecting means with the raster scanning period of said display, a counter for counting the number of times of detection of the coincidence of the periods by said coincidence detector, and pulse signal applying means for applying the n-th (where n is a predetermined integer) pulse signal included in the received signal of said control signal receiver to said information processing means in response to the count of said counting means reaching a predetermined value.

13. The external storage according to claim 12, wherein said control signal extracting means further comprises inhibiting means for inhibiting the pulse signal from being applied to said information processing means in response to detection of the noncoincidence of the periods by said coincidence detector before the counted value of said counter reaches the predetermined value.

14. A shooting game system for shooting a target displayed on a raster scan type display in a position spaced apart from the display to play a shooting game, comprising:

game processing apparatus being connected to said display for performing processing for the shooting game;

a shooting scope used in a position spaced apart from said display for shooting the target displayed on said display;

said shooting scope comprising;

a trigger signal generator for generating a trigger signal in response to an operation performed by a player, a photoelectric converter for converting light from a position which is shot on said display into an electric signal which is synchronized with raster scanning of said display, and a control signal transmitter for transmitting a control signal based on the electric signal output from said photoelectric converter to said game processing apparatus in response to said trigger signal from said trigger signal generator, said game processing apparatus comprising a control signal receiver for receiving the control signal transmitted from said control signal transmitter, shot coordinate position determining means for detecting a coordinate position which is shot by said shooting scope on said display on the basis of said control signal received by said control signal receiver, reference mark display controlling means for displaying a reference mark in a predetermined fixed position on said display before starting the game, an error detector for operating, when said reference mark is shot by said shooting scope, to detect an error between the coordinate position detected by said shot coordinate position detecting means and a coordinate position of said reference mark, error storing means for storing the error detected by said error detector, target display controlling means for displaying the target on said display while the game is played, correcting means for correcting, when the target on said display is shot by said shooting scope, the relative positional relationship between a coordinate position of the target and the coordinate position detected by said shot coordinate position detecting means on the basis of the error stored in said error storing means, and hit judging means for making a hit determination in a case where said target is shot by said shooting scope on the basis of said relative positional relationship after being corrected by said correcting means; wherein the control signal transmitted by said control signal transmitter includes a plurality of pulse signals which are synchronized with raster scanning of said display, said game processing apparatus further comprises control signal extracting means for extracting only the control signal transmitted by said control signal transmitter from a received signal of said control signal receiver on the basis of the periodicity of a plurality of pulse signals included in the received signal, and said shot coordinate position detecting means detects the coordinate position which is shot by said shooting scope on said display on the basis of the control signal extracted by said control signal extracting means.

15. The shooting game system according to claim 14, wherein said control signal extracting means extracts a n-th (where n is a predetermined integer) pulse signal out of the plurality of pulse signals included in the received signal of said control signal receiver as a pulse signal corresponding to raster scan light from the coordinate position which is shot by said shooting scope on said display, and said shot coordinate position detecting means detects the coordinate position which is shot by said shooting scope on said display on the basis of the n-th pulse signal extracted by said control signal extracting means.

16. The shooting game system according to claim 15, wherein said control signal extracting means comprises period detecting means for sequentially detecting the respective periods of the plurality of pulse signals included in the received signal of said control signal receiver a coincidence detector for detecting the coincidence of the period detected by said period detecting means with the raster scanning period of said display, a counter for counting the number of times of detection of the coincidence of the periods by said coincidence detector, and pulse signal applying means for applying the n-th (where n is a predetermined integer) pulse signal included in the received signal of said control signal receiver to said shot coordinate position detecting means in response to the count of said counting means reaching a predetermined value.

17. The shooting game system according to claim 16, wherein, said control signal extracting means further comprises inhibiting means for inhibiting the pulse signal from being applied to said shot coordinate position detecting means in response to detection of the noncoincidence of the periods by said coincidence detector before the counted value of said counter reaches a predetermined value.

18. An external storage for use with a shooting game system comprising a game processing apparatus connected to a raster scan type display and a shooting scope used in a position spaced apart from said display for shooting a target displayed in said display and connected to said game processing apparatus, wherein said shooting scope comprising a trigger signal generator for generating a trigger signal in response to an operation performed by a player, a photoelectric converter for converting light from a position which is shot on said display into an electric signal which is synchronized with raster scanning of said display, and a control signal transmitter for transmitting by optical space communication a control signal based on the electric signal outputted from said photoelectric converter to said game processing apparatus in response to said trigger signal from said trigger signal generator, said game processing apparatus comprises information processing means for performing predetermined processing for the shooting game in accordance with program data applied from said external storage, and a control signal receiver for receiving the control signal transmitted from said control signal transmitter;

said external storage comprising:

first program storing means storing first program data for detecting a coordinate position which is shot by said shooting scope on said display on the basis of said control signal received by said control signal receiver;

second program storing means storing second program data for displaying a reference mark at a predetermined fixed position on said display before starting a game;

third program storing means storing third program data for operating, when said reference mark is shot by said shooting scope, to detect an error between the coordinate position detected in accordance with said first program data and a coordinate position of said reference mark and for storing data indicative of said error in an error data storing means;

fourth program storing means storing fourth program data for displaying the target on said display while the game is played;

fifth program storing means storing fifth program data for correcting, when the target on said display is shot by said shooting scope, the relative positional relationship between a coordinate position of the target and the coordinate position detected in accordance with said first program data on the basis of the error stored in said error data storing means; and sixth program storing means storing sixth program data for making a hit determination in a case where said target is shot by said shooting scope on the basis of said relative positional relationship after being corrected in accordance with said fifth program data; wherein the control signal transmitted by said control signal transmitter comprising a plurality of pulse signals which are synchronized with raster scanning of said display, said game processing apparatus further comprising control signal extracting means for extracting only the control signal transmitted by said control signal transmitting means from a receiver on the basis of the periodicity of a plurality of pulse signals included in the receiver signal, and said first program data comprises program data for detecting the coordinate position which is shot by said shooting scope on said display on the basis of the control signal extracted by said control signal extracting means.

19. A shooting game system for shooting a target displayed on a raster type display for playing a shooting game comprising;

a shooting scope having a light receiving axis for shooting a target displayed on said display, said shooting scope including a sight having a sighting axis at a predetermined angle with respect to the light receiving axis, whereby said sighting axis intersects the light receiving axis of said shooting scope on said display when the distance between the shooting scope and said display is a predetermined distance;

game processing apparatus, coupled to said display, including:

means for displaying a reference mark on said display, means for detecting said reference mark and for determining a sighting correction value which varies as a function of the distance between said shooting scope and said display, and means for determining a target hit using said sight correction value.

20. A shooting game system according to claim 19, wherein said shooting scope includes a control signal transmitter for transmitting a control signal having a plurality of pulses in response to a trigger operation by a player, said shooting game system further including a control signal receiver for receiving said control signal and for detecting a predetermined one of said plurality of pulses.

21. A shooting game system for shooting a target displayed on a raster type display for playing a shooting game comprising:

a shooting scope having a trigger switch and including a trigger signal generator for generating a trigger signal in response to actuation of said trigger switch, a photoelectric converter for converting a light signal from a displayed image from the portion of the display screen at which the shooting scope is aimed into an electrical signal synchronized with the raster scanning of said display, and a control signal transmitter for receiving said electrical signal from said photoelectric converter for transmitting a control signal including a trigger code and a plurality of raster timing pulses in response to said trigger signal;

a control signal receiver for receiving said control signal, said receiver including a decoder for decoding said trigger code and raster analyzer circuitry for receiving said plurality of raster timing pulses and for generating a raster output signal indicative of at least one of said plurality of raster timing pulses;

video game processing apparatus for receiving said raster output signal and for determining the coordinate position which is shot by said shooting scope in part in response to said raster output signal.

22. A shooting game system according to claim 21, wherein said game processing apparatus includes shot coordinate position detecting means for detecting a coordinate position shot by said shooting scope based on a raster coordinate position on said display at the time of receiving said at least one of said plurality of raster timing pulses.

23. A shooting game system according to claim 22, wherein said video game processing apparatus includes means for determining a shooting scope sighting correction value in part in response to said raster output signal, said means for determining a shooting scope sighting correction value including reference mark display means for displaying a reference mark, error detecting means for detecting an error between the coordinate position detected by said shot coordinate position detecting means and a detected position of said reference mark, and correcting means for correcting the relative positional relationship between a coordinate position of the target and the coordinate position detected by said shot coordinate position detector means based on said detected error.

24. A shooting game system according to claim 21, wherein said video game processing apparatus includes means for determining a shooting scope sighting correction value in part in response to said raster output signal.

* * * * *